US012729578B2

(12) United States Patent
Kaji et al.

(10) Patent No.: US 12,729,578 B2
(45) Date of Patent: Sep. 8, 2026

(54) VEHICLE DOOR DEVICE

(71) Applicant: AISIN CORPORATION, Kariya (JP)

(72) Inventors: Yosuke Kaji, Kariya (JP); Jueru Shimizu, Kariya (JP); Masayoshi Yamaguchi, Kariya (JP); Seiichi Sumiya, Kariya (JP); Naoki Gotoh, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 19/128,808

(22) PCT Filed: Feb. 2, 2024

(86) PCT No.: PCT/JP2024/003387

§ 371 (c)(1),
(2) Date: May 9, 2025

(87) PCT Pub. No.: WO2024/181013

PCT Pub. Date: Sep. 6, 2024

(65) Prior Publication Data

US 2026/0168310 A1 Jun. 18, 2026

(30) Foreign Application Priority Data

Mar. 1, 2023 (JP) ................................ 2023-030821
Mar. 1, 2023 (JP) ................................ 2023-030822

(51) Int. Cl.
*E05D 15/34* (2006.01)
*E05F 15/649* (2015.01)

(52) U.S. Cl.
CPC ............ *E05D 15/34* (2013.01); *E05F 15/649* (2015.01); *E05Y 2201/624* (2013.01); *E05Y 2201/712* (2013.01); *E05Y 2900/531* (2013.01)

(58) Field of Classification Search
CPC ...................................................... E05D 15/34
See application file for complete search history.

(56) References Cited

U.S. PATENT DOCUMENTS 6,030,024 A * 2/2000 Schmidhuber .......... E05D 15/34 296/146.12
6,834,834 B2 * 12/2004 Dazet ...................... B64C 1/143 244/129.4

(Continued)

FOREIGN PATENT DOCUMENTS

CN 114718411 A * 7/2022 ................ B60J 5/06
CN 115110872 A * 9/2022 ............ E05F 15/649

(Continued)

OTHER PUBLICATIONS

Apr. 9, 2024 International Search Report issued in International Patent Application No. PCT/JP2024/003387.

*Primary Examiner* — Catherine A Kelly
(74) *Attorney, Agent, or Firm* — Oliff PLC

(57) ABSTRACT

A transmission mechanism includes: an engagement portion provided to a drive link; a support shaft; a drive member supported rotatably around the support shaft, and having an engagement coupling portion with respect to the engagement portion and a transmission gear portion centered on the support shaft; and a torque input gear configured to be input with a driving torque in a state of being meshed with the transmission gear portion. The transmission mechanism is configured such that a position at which the engagement coupling portion is engaged with the engagement portion is disposed at a position same as a position at which the torque input gear is meshed with the transmission gear portion, in an axial direction of a coupling shaft of the drive link.

20 Claims, 22 Drawing Sheets

(56) References Cited

U.S. PATENT DOCUMENTS

| | | | | |
|---|---|---|---|---|
| 6,997,504 | B1 * | 2/2006 | Lang | E05D 3/127 296/146.12 |
| 8,713,852 | B2 * | 5/2014 | Choi | E05F 11/48 49/218 |
| 9,475,368 | B2 * | 10/2016 | Choi | E05B 83/40 |
| 10,787,845 | B2 * | 9/2020 | Trentin | E05D 3/127 |
| 10,876,341 | B2 * | 12/2020 | Taylor | E05F 15/41 |
| 11,560,744 | B2 * | 1/2023 | Pujol Oller | E05D 13/00 |
| 11,738,626 | B2 * | 8/2023 | Sumiya | E05D 15/101 296/146.12 |
| 11,807,080 | B2 * | 11/2023 | Gabbianelli | B60J 10/40 |
| 11,913,265 | B2 * | 2/2024 | Sumiya | E05C 17/50 |
| 12,196,022 | B2 * | 1/2025 | Kajino | E05D 15/1005 |
| 12,359,480 | B2 * | 7/2025 | Dosenbach | E05D 3/127 |
| 12,552,232 | B2 * | 2/2026 | Shimizu | B60J 5/047 |
| 2010/0171336 | A1 * | 7/2010 | Elliott | B60J 5/06 296/146.12 |
| 2012/0117884 | A1 * | 5/2012 | Oshima | E05D 3/18 16/362 |
| 2022/0185079 | A1 * | 6/2022 | Sumiya | E05F 15/63 |
| 2024/0401392 | A1 | 12/2024 | Araki et al. | |
| 2025/0188787 | A1 * | 6/2025 | Feng | E05D 15/28 |
| 2025/0305338 | A1 * | 10/2025 | Araki | E05D 11/1042 |

FOREIGN PATENT DOCUMENTS

| | | | | |
|---|---|---|---|---|
| DE | 3805192 | A1 * | 8/1989 | E05D 15/34 |
| DE | 102007032835 | A1 * | 1/2009 | E05F 15/638 |
| DE | 202022002146 | U1 * | 12/2022 | E05F 15/649 |
| EP | 2261449 | A1 * | 12/2010 | E05D 3/122 |
| GB | 2050478 | A * | 1/1981 | E05D 15/1081 |
| JP | H01-168681 | U | 11/1989 | |
| JP | H11-223067 | A | 8/1999 | |
| JP | 2009-113607 | A | 5/2009 | |
| JP | 2014-122536 | A | 7/2014 | |
| JP | 2021-95762 | A | 6/2021 | |
| JP | 2022-092327 | A | 6/2022 | |
| JP | 2023-068579 | A | 5/2023 | |

* cited by examiner

VEHICLE DOOR DEVICE

TECHNICAL FIELD

The present disclosure relates to a vehicle door device.

BACKGROUND ART

Conventionally, for example, as disclosed in Patent Literature 1, there is a vehicle door device that includes first and second link arms each having a first rotary coupling point with respect to a vehicle body and a second rotary coupling point with respect to a door of a vehicle. Such a door device causes a door provided at a door opening to perform opening and closing operations on the basis of an operation of a link mechanism formed by the first and second link arms. The door device of the conventional example above is provided with an actuator for driving the link mechanism.

Specifically, the actuator is disposed below a bracket constituting the first rotary coupling point with respect to the vehicle body, and uses the first link arm as a drive link. More specifically, a drive arm that is rotated by a driving torque output from the actuator is coupled to an output shaft of the actuator. The door device of the conventional example has a coupling point of the drive arm at a position between the first rotary coupling point and the second rotary coupling point in the first link arm.

CITATIONS LIST

Patent Literature

Patent Literature 1: JP 2022-92327 A

SUMMARY OF DISCLOSURE

Technical Problems

However, in vehicles for which electrification progresses, efficiency improvement is always required. Also in the door device using the link mechanism as described above, more efficiently transmitting the driving torque generated by the actuator to the drive link has been an important issue.

Solutions to Problems

A vehicle door device according to one aspect of the present disclosure includes: first and second link arms each having a first rotary coupling point with respect to a vehicle body and a second rotary coupling point with respect to a door of a vehicle; and a drive device configured to cause the door to perform opening and closing operations by rotating a drive link that is at least one of the first and second link arms, around a coupling axis passing through the first rotary coupling point. The drive device includes an actuator configured to output a driving torque and a transmission mechanism configured to transmit the driving torque to the drive link. The transmission mechanism includes: an engagement portion provided to the drive link; a support shaft; a drive member supported rotatably around the support shaft, and having an engagement coupling portion with respect to the engagement portion and a transmission gear portion centered on the support shaft; and a torque input gear configured to be input with the driving torque in a state of being meshed with the transmission gear portion. The transmission mechanism is configured such that, in an axial direction of the coupling axis, a position at which the engagement coupling portion is engaged with the engagement portion is disposed at a position same as a position at which the torque input gear is meshed with the transmission gear portion.

DESCRIPTION OF EMBODIMENTS

First Embodiment

Hereinafter, a first embodiment of a vehicle door device will be described with reference to FIGS. 1 to 14.

(Link Mechanism)

Figure 1:
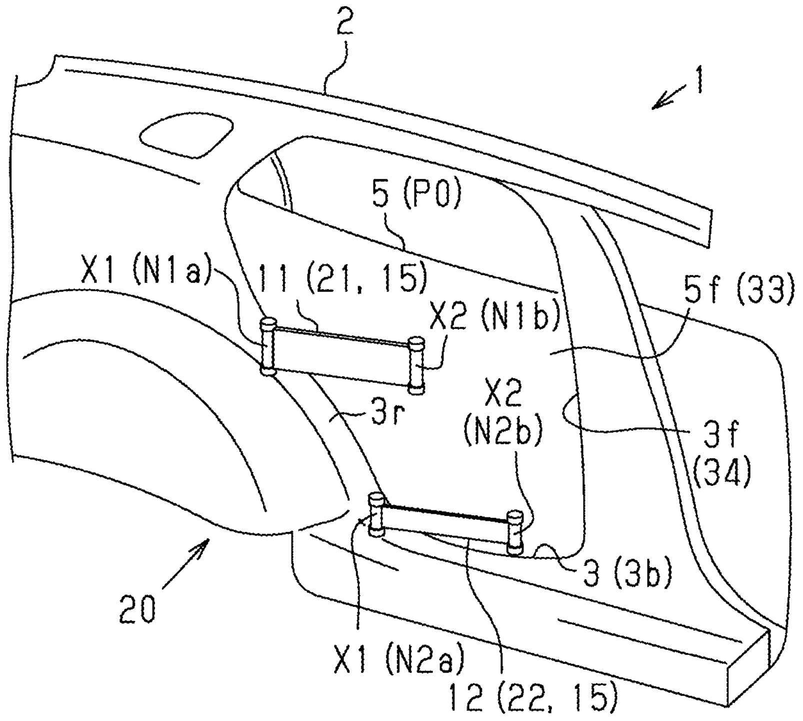
FIG. 1 is a perspective view of a door device of a first embodiment, as viewed from inside a vehicle compartment.
Figure 2:
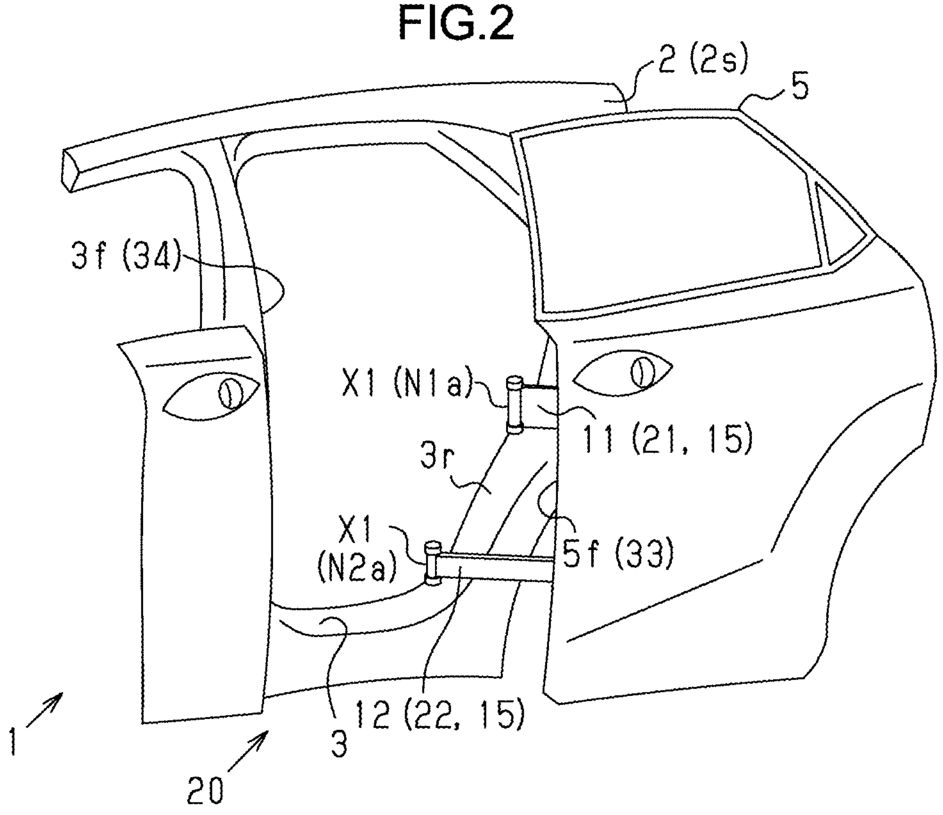
FIG. 2 is a perspective view of the door device of FIG. 1, as viewed from outside the vehicle compartment.

As illustrated in FIGS. 1 and 2, a vehicle 1 of the present embodiment includes a door opening 3 provided on a side surface 2*s* of a vehicle body 2. The door opening 3 is provided with a first link arm 11 and a second link arm 12 that support a door 5 of the vehicle 1 at the door opening 3.

The first and second link arms 11 and 12 each have a first rotary coupling point X1 with respect to the vehicle body 2 and a second rotary coupling point X2 with respect to the door 5. Specifically, the first link arm 11 is coupled to the vehicle body 2 in a state of being supported by a support shaft N1*a* extending in a vertical direction of the vehicle 1 (a vertical direction in each figure), and is coupled to the door 5 in a state of being supported by a support shaft N1*b* extending in the vertical direction. The second link arm 12 is also coupled to the vehicle body 2 in a state of being supported by a support shaft N2*a* extending in the vertical direction of the vehicle 1, and coupled to the door 5 in a state of being supported by a support shaft N2*b* extending in the vertical direction.

As illustrated in FIGS. 3 to 6, in the vehicle 1, the first and second link arms 11 and 12 form a link mechanism 15 having a four-node link configuration. The vehicle 1 causes the door 5 supported at the door opening 3 to perform opening and closing operations on the basis of an operation of the link mechanism 15.

More specifically, as illustrated in FIGS. 1 and 2, the vehicle 1 supports the door 5 at the door opening 3 on a vehicle rear side (the left side in FIG. 1, the right side in FIG. 2) by using the first and second link arms 11 and 12. Each of the first and second link arms 11 and 12 has the first rotary coupling point X1 rotatably coupled to the vehicle body 2 in the vicinity of a rear edge portion 3*r* of the door opening 3. In the vehicle 1 of the present embodiment, the first and second link arms 11 and 12 are disposed apart from each other in the vertical direction.

The first link arm 11 is provided above the second link arm 12. The first link arm 11 has the second rotary coupling point X2 rotatably coupled to the door 5 at a substantially central position in a front-rear direction of the door 5. The second link arm 12 has the second rotary coupling point X2 coupled to the door 5 in the vicinity of a front end portion 5*f* of the door 5. As a result, a door device 20 that causes the door 5 to perform the opening and closing operations on the basis of an operation of the link mechanism 15 is formed.

As illustrated in FIGS. 3 to 6, during the opening operation of the door 5, the first and second link arms 11 and 12 each rotate in the counterclockwise direction in each figure around the corresponding first rotary coupling point X1. As a result, the door 5 supported by the first and second link arms 11 and 12 performs the opening operation toward the vehicle rear side (the left side in each figure).

During the closing operation of the door 5, the first and second link arms 11 and 12 each rotate in the clockwise direction in each figure around the corresponding first rotary coupling point X1. As a result, the door 5 of the vehicle 1 supported by the first and second link arms 11 and 12 performs the closing operation toward a vehicle front side (the right side in each figure).

Figure 3:
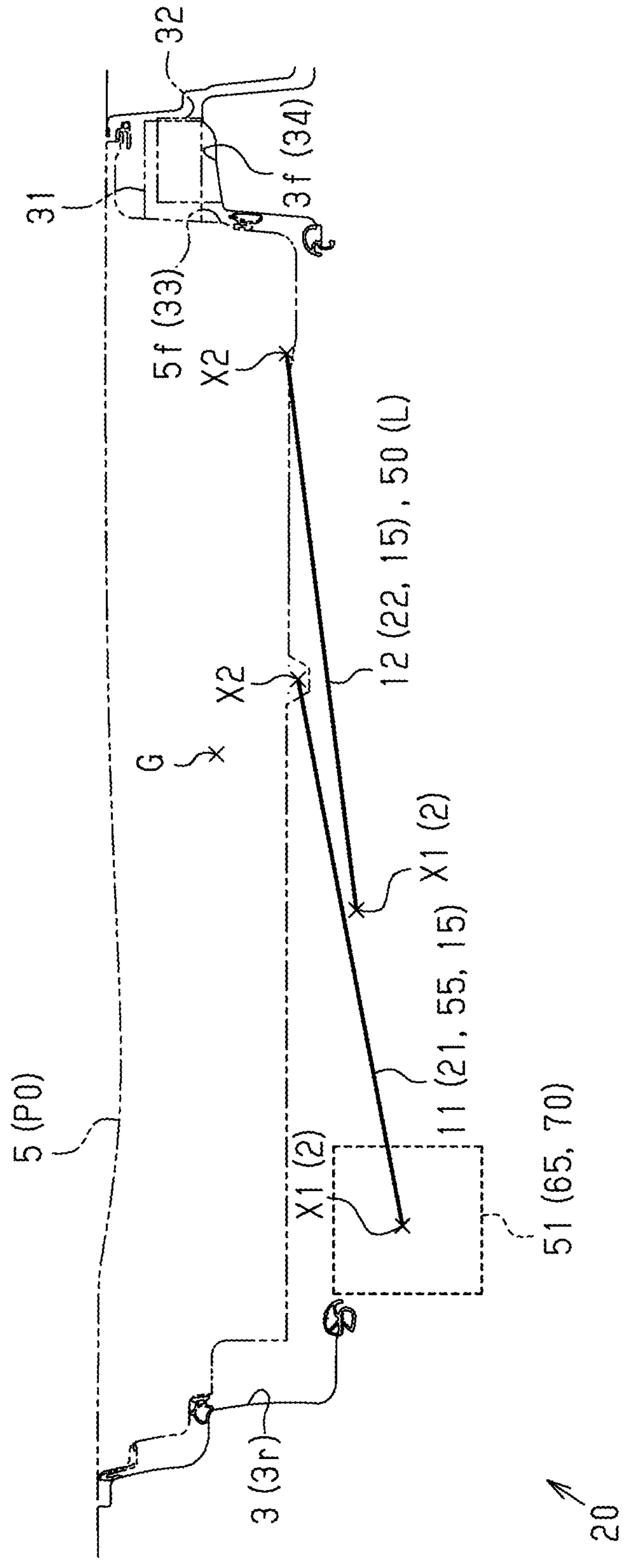
FIG. 3 is a plan view of first and second link arms forming a link mechanism of the door device of FIG. 1.
Figure 4:
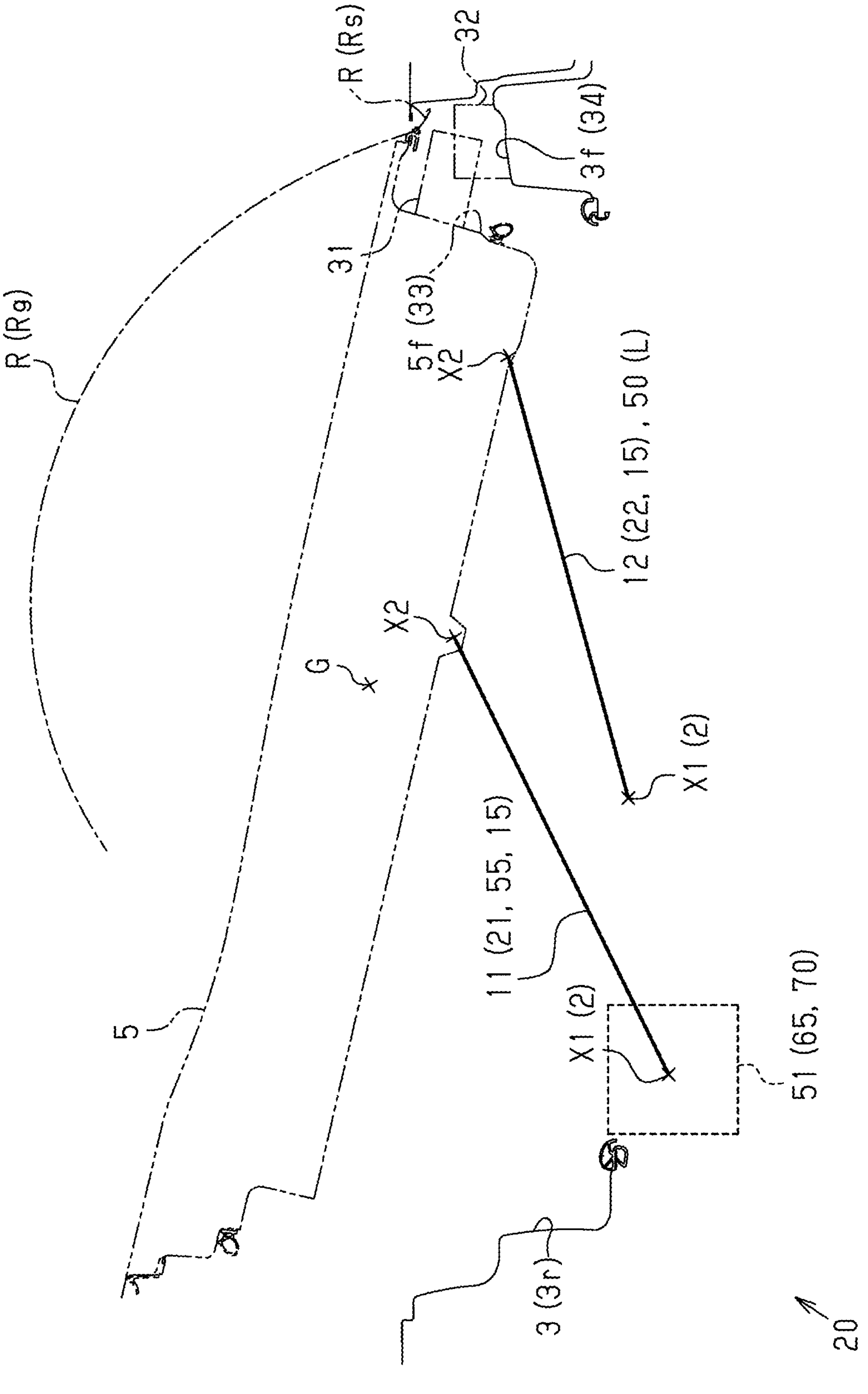
FIG. 4 is a plan view of the first and second link arms forming the link mechanism of the door device of FIG. 1.
Figure 5:
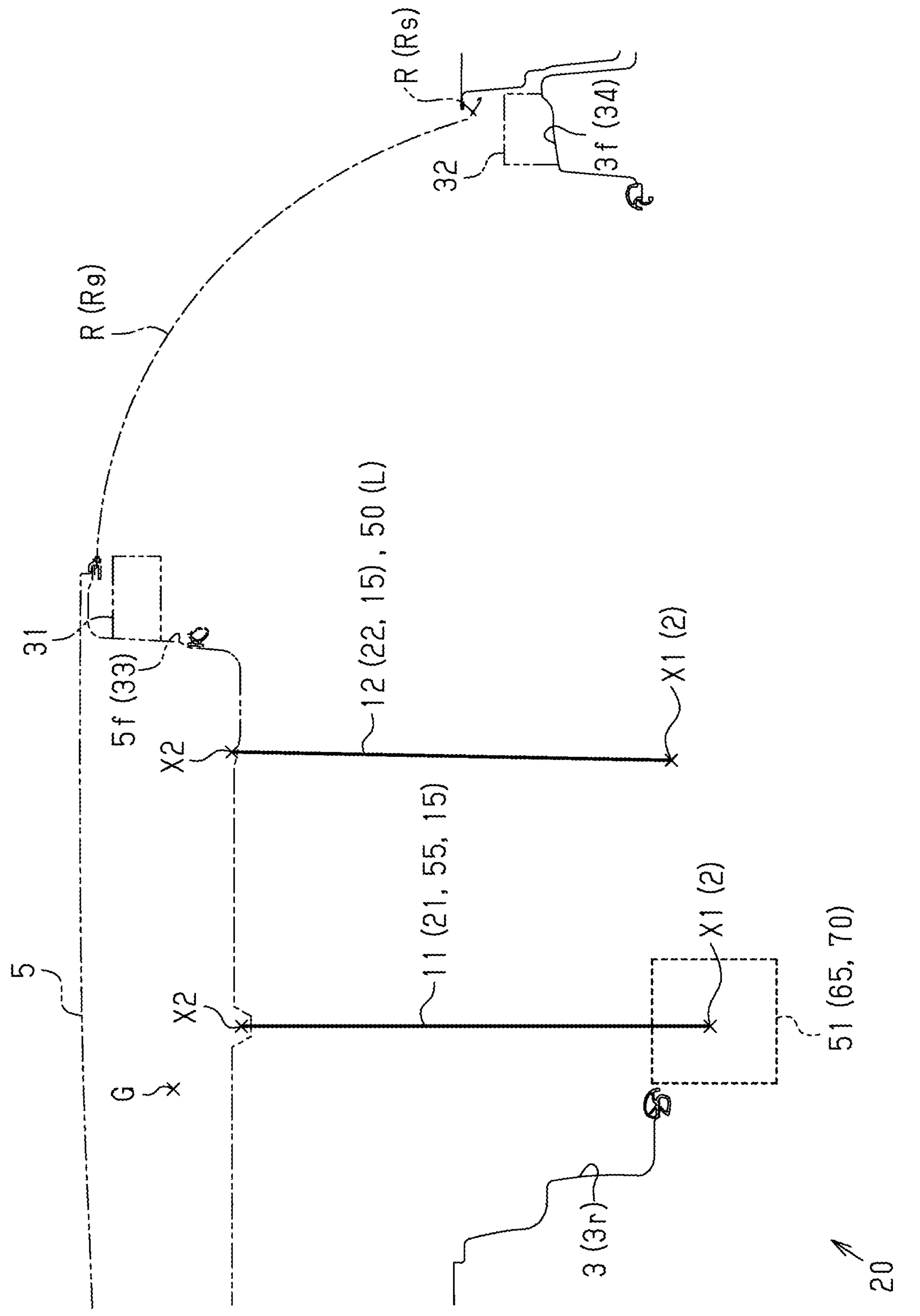
FIG. 5 is a plan view of the first and second link arms forming the link mechanism of the door device of FIG. 1.
Figure 6:
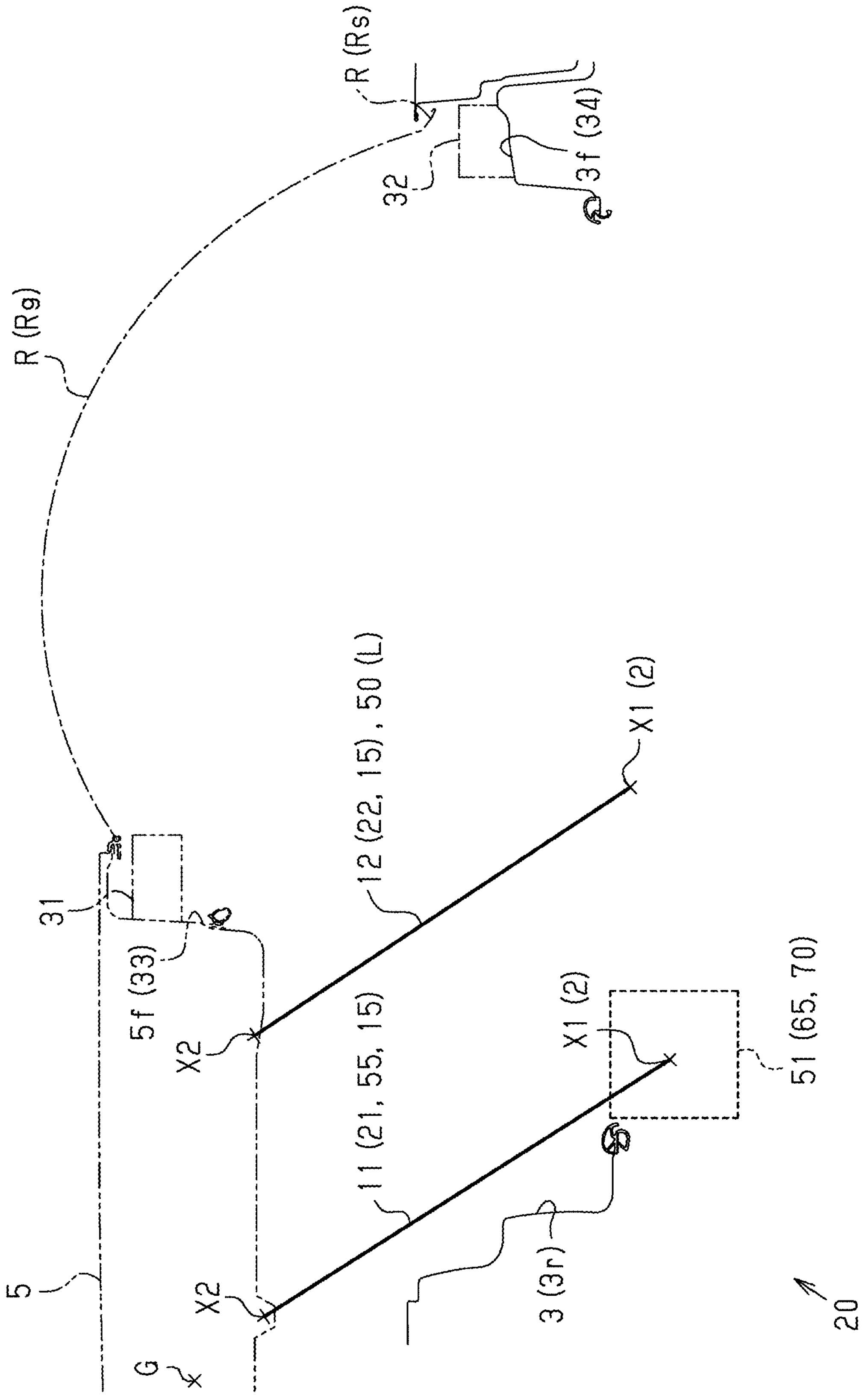
FIG. 6 is a plan view of the first and second link arms forming the link mechanism of the door device of FIG. 1.

An opening/closing operation trajectory R of the door 5 is defined so as to draw an arc-shaped trajectory Rg on the basis of the operation of the link mechanism 15. That is, as illustrated in FIG. 5, at an intermediate position at which the first and second link arms 11 and 12 extend in a vehicle width direction (the vertical direction in FIGS. 3 to 6), a movement amount in the vehicle front-rear direction with respect to a rotation amount of the first and second link arms 11 and 12 increases. As illustrated in FIGS. 3 and 4, as an opening/closing operation position of the door 5 is closer to a full closed position P0, the first and second link arms 11 and 12 extend in the vehicle front-rear direction (the horizontal direction in FIGS. 3 to 6), so that the movement amount in the vehicle width direction with respect to the rotation amount of the first and second link arms 11 and 12 increases.

In the door device 20, the first link arm 11 has the second rotary coupling point X2 with respect to the door 5 at a position closer to a barycenter G of the door 5 than the second link arm 12. As a result, the first link arm 11 is set as a main link 21 that supports a larger door load. The second link arm 12 is set as a sub link 22 for a relatively small door load.

The first link arm 11 has a larger outer shape than the second link arm 12. Accordingly, high support rigidity is imparted to the first link arm 11 which is the main link 21.

(Door-Side Engagement Portion and Vehicle-Body-Side Engagement Portion)

As illustrated in FIGS. 3 to 7, the door device 20 includes a door-side engagement portion 31 provided at the front end portion 5*f* of the door 5 and a vehicle-body-side engagement portion 32 provided at a front edge portion 3*f* of the door opening 3.

The door-side engagement portion 31 is provided at a closed-side end portion 33 that is a portion located on a closing operation side of the door 5 that opens and closes the door opening 3 on the basis of the operation of the link mechanism 15. The vehicle-body-side engagement portion 32 is provided at a closed-side end portion 34 which is a portion of the door opening 3 where the closed-side end portion 33 of the door 5 approaches or separates, on the basis of the opening and closing operations of the door 5 that moves in the vehicle front-rear direction. The door-side engagement portion 31 and the vehicle-body-side engagement portion 32 are engaged with each other in a state where the door 5 is in the vicinity of the full closed position P0.

More specifically, the door-side engagement portion 31 includes a shaft-shaped portion 41 extending in the vertical direction (a direction orthogonal to the page of FIG. 7) of the vehicle 1. The shaft-shaped portion 41, which is a guide engagement portion 40, includes a roller 42 that rotates around a support shaft extending in the vertical direction. The vehicle-body-side engagement portion 32 has a pair of side wall portions 43*a* and 43*b* facing each other in the vehicle width direction (the vertical direction in FIG. 7). The pair of side wall portions 43*a* and 43*b* define a guide groove 43 extending in an opening/closing operation direction of the door 5. When the door 5 is in the vicinity of the full closed position P0, the door-side engagement portion 31 and the vehicle-body-side engagement portion 32 are engaged with each other by the shaft-shaped portion 41 arranged in the guide groove 43.

The shaft-shaped portion 41 of the door-side engagement portion 31 is disposed in the guide groove 43 of the vehicle-body-side engagement portion 32, and the shaft-shaped portion 41 is sandwiched between the pair of side wall portions 43*a* and 43*b* facing each other in the vehicle width direction, whereby displacement of the door 5 in the vehicle width direction is restricted. As a result, the door 5 can be stably supported even in the vicinity of the full closed position P0 at which the first and second link arms 11 and 12 forming the link mechanism 15 are likely to be in a state of being aligned.

(Coupling Length Variable Mechanism)

As illustrated in FIGS. 3 to 6, the second link arm 12 which is the sub link 22 is provided with a coupling length variable mechanism 50 capable of changing a coupling length L between the first and second rotary coupling points X1 and X2. The coupling length variable mechanism 50 is biased in a direction of shortening the length between the first and second rotary coupling points X1 and X2, that is, shortening the coupling length L of the door 5 by the second link arm 12 provided with the coupling length variable mechanism 50. As a result, the door 5 performs the opening and closing operations in a state where the coupling length L by the second link arm 12 is shortened.

Figure 7:
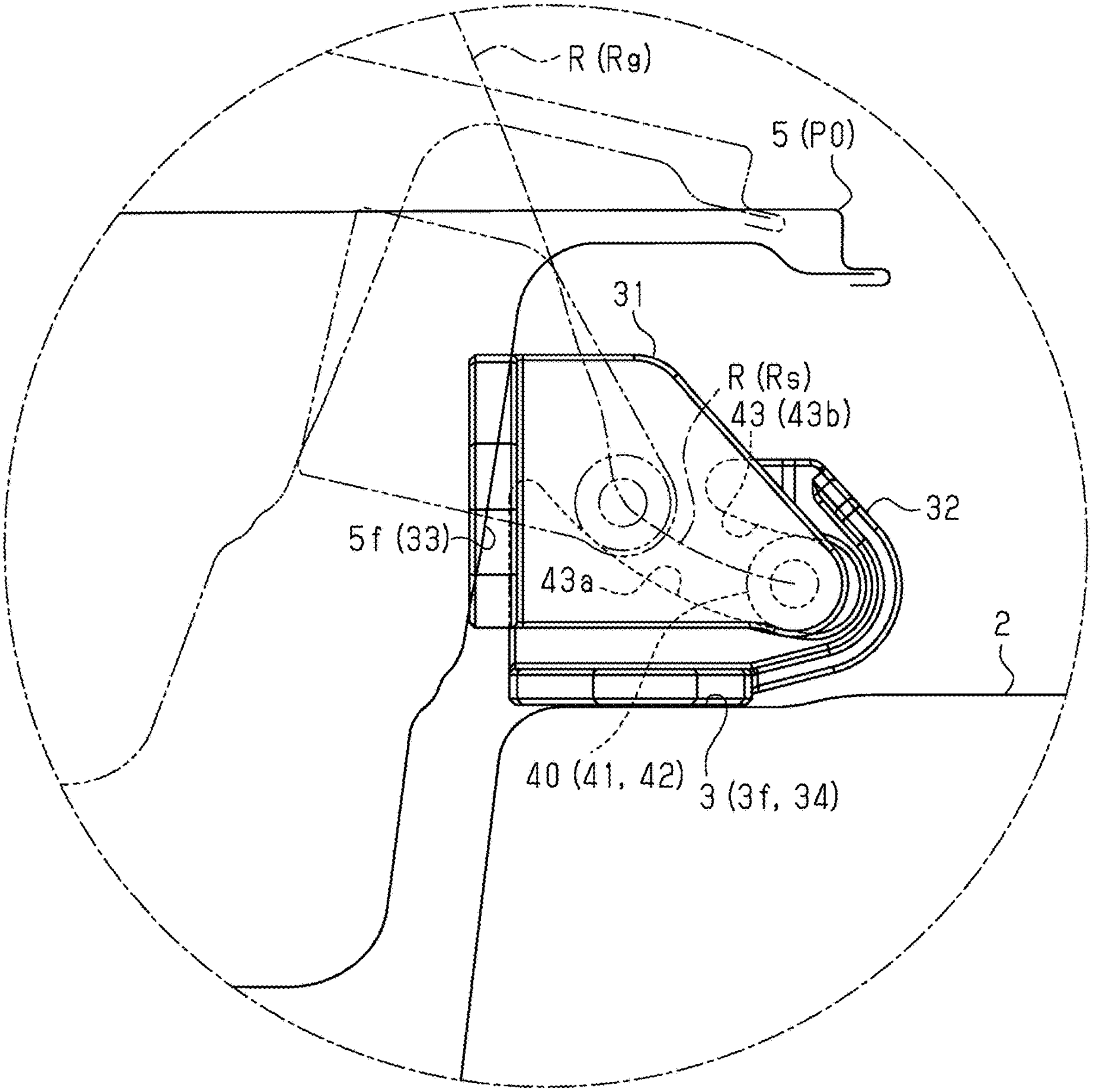
FIG. 7 is a schematic configuration diagram of a door-side engagement portion and a vehicle-body-side engagement portion of the door device of FIG. 1.

As illustrated in FIGS. 3, 4, and 7, in the door device 20, on the basis of an operation of the coupling length variable mechanism 50 provided to the second link arm 12, the opening and closing operations of the door 5 are allowed in a state where the door-side engagement portion 31 and the vehicle-body-side engagement portion 32 are engaged with each other. Specifically, when the door 5 performs the opening and closing operations in a state where the door-side engagement portion 31 and the vehicle-body-side engagement portion 32 are engaged with each other, the guide engagement portion 40 is relatively displaced along an extending direction of the guide groove 43 with a change of the coupling length L on the basis of the operation of the coupling length variable mechanism 50. As a result, the opening/closing operation trajectory R of the door 5 changes.

That is, when the door 5 moves to the full closed position P0, the door-side engagement portion 31 is engaged with the vehicle-body-side engagement portion 32, whereby the opening and closing operations of the door 5 are guided in a state where the guide engagement portion 40 is disposed in the guide groove 43. As a result, the opening/closing operation trajectory R of the door 5 changes from the arc-shaped trajectory Rg based on the operation of the link mechanism 15 to a linear trajectory Rs along an opening width direction of the door opening 3.

Specifically, during the full-closing operation of the door 5, an operating force in a closing operation direction is applied to the door 5 in a state where the door-side engagement portion 31 and the vehicle-body-side engagement portion 32 are engaged with each other. In the door device 20, an operating force for causing the door 5 to perform the opening and closing operations may be, for example, a driving force of a drive device 51 described in detail below or a force applied by a manual operation of a user. At this time, the coupling length variable mechanism 50 provided to the second link arm 12 operates on the basis of the operating force in the closing operation direction. As a result, the coupling length L of the door 5 by the second link arm 12 is extended on the basis of the engagement state between the door-side engagement portion 31 and the vehicle-body-side engagement portion 32. As a result, the door 5 supported by the link mechanism 15 performs the closing operation toward the full closed position P0 in a mode of drawing the linear trajectory Rs as described above.

When the door 5 performs the opening operation from the full closed position P0, an operating force in an opening operation direction is applied to the door 5 in a state where the door-side engagement portion 31 and the vehicle-body-side engagement portion 32 are engaged with each other. At this time, the coupling length variable mechanism 50 operates on the basis of the operating force in the opening operation direction. As a result, the coupling length L of the door 5 by the second link arm 12 is shortened on the basis of the engagement state between the door-side engagement portion 31 and the vehicle-body-side engagement portion 32. As a result, the door 5 supported by the link mechanism 15 performs the opening operation from the full closed position P0 in the same mode of drawing the linear trajectory Rs.

(Drive Device)

As illustrated in FIGS. 8 to 11, the door device 20 includes the drive device 51 that drives the door 5 to open and close. The drive device 51 applies a driving torque to the first link arm 11 which is the main link 21. That is, the first link arm 11 is used as a drive link 55. As a result, the drive device 51 rotates the first link arm 11 around the first rotary coupling point X1 with respect to the vehicle body 2, to cause the door 5 to perform the opening and closing operations supported by the first link arm 11.

More specifically, the first link arm 11 includes an arm body 60 having an outer shape of an elongated substantially rod shape. The arm body 60 of the present embodiment is formed by arranging two pipe members parallel to each other. In addition, the first link arm 11 includes a proximal end bracket 61 and a distal end bracket 62 that are coupled to longitudinal end portions of the arm body 60. The door device 20 includes a vehicle body bracket 63 fixed near the rear edge portion 3*r* of the door opening 3 and a door bracket 64 fixed to an inside surface 5*s* of the door 5. The proximal end bracket 61 of the first link arm 11 is rotatably coupled to the vehicle body bracket 63. The distal end bracket 62 of the first link arm 11 is rotatably coupled to the door bracket 64.

That is, the proximal end bracket 61 and the vehicle body bracket 63 relatively rotatably coupled to each other form the first rotary coupling point X1 in the first link arm 11. Similarly, the distal end bracket 62 and the door bracket 64 relatively rotatably coupled to each other form the second rotary coupling point X2 in the first link arm 11. The drive device 51 inputs a driving torque to a proximal end portion 11*b* of the first link arm 11 supported rotatably with respect to the vehicle body 2.

In addition, the drive device 51 includes an actuator 65 that outputs a driving torque by using a motor 65*m* as a drive source, and a transmission mechanism 70 that transmits the driving torque to the first link arm 11 which is the drive link 55. The transmission mechanism 70 is disposed at a position at which the proximal end bracket 61 and the vehicle body bracket 63 form the first rotary coupling point X1 in the first link arm 11.

Specifically, the proximal end bracket 61 constituting the proximal end portion 11*b* of the first link arm 11 includes a base portion 72 fixed to a proximal end 60*b* of the arm body 60. The base portion 72 has an outer shape of, for example, a substantially rectangular plate shape extending in the vertical direction of the vehicle 1. In addition, the proximal end bracket 61 includes first and second link-side coupling portions 73*a* and 73*b* extending in a direction in which the arm body 60 is extended from a lower end and an upper end of the base portion 72, respectively, that is, in a longitudinal direction of the arm body 60. Therefore, the proximal end bracket 61 has an outer shape of a substantially U shape. The vehicle body bracket 63 fixed to the vehicle body 2 at the rear edge portion 3*r* of the door opening 3 also includes first and second vehicle-body-side coupling portions 75*a* and 75*b* facing each other in the vertical direction at positions separated in the vertical direction.

The first and second link-side coupling portions 73*a* and 73*b* are rotatably coupled respectively to the first and second vehicle-body-side coupling portions 75*a* and 75*b* via a coupling pin 76 which is the support shaft N1*a*, at positions separated in the vertical direction. Thus, the drive link 55 is rotatable around a coupling axis 77 passing through the first rotary coupling point X1 with respect to the vehicle body 2.

As illustrated in FIGS. 9 to 12, the transmission mechanism 70 is formed by fixing a drive transmission unit 80 having a support bracket 78, to the vehicle body bracket 63.

Specifically, the drive transmission unit 80 is disposed above the first vehicle-body-side coupling portion 75*a* in a state of being fixed to the first vehicle-body-side coupling portion 75*a* located on a lower side, among the first and second vehicle-body-side coupling portions 75*a* and 75*b* constituting the vehicle body bracket 63. The actuator 65 is fixed to an upper bracket 81 forming an upper end surface 80*s* of the drive transmission unit 80. As a result, the actuator 65 and the drive transmission unit 80 are disposed in an integrated state at the first rotary coupling point X1 of the first link arm 11. Specifically, the drive transmission unit 80 is disposed between a first position Y1 at which the first link-side coupling portion 73*a* and the first vehicle-body-side coupling portion 75*a* are coupled to each other and a second position Y2 at which the second link-side coupling portion 73*b* and the second vehicle-body-side coupling portion 75*b* are coupled to each other.

Figure 8:
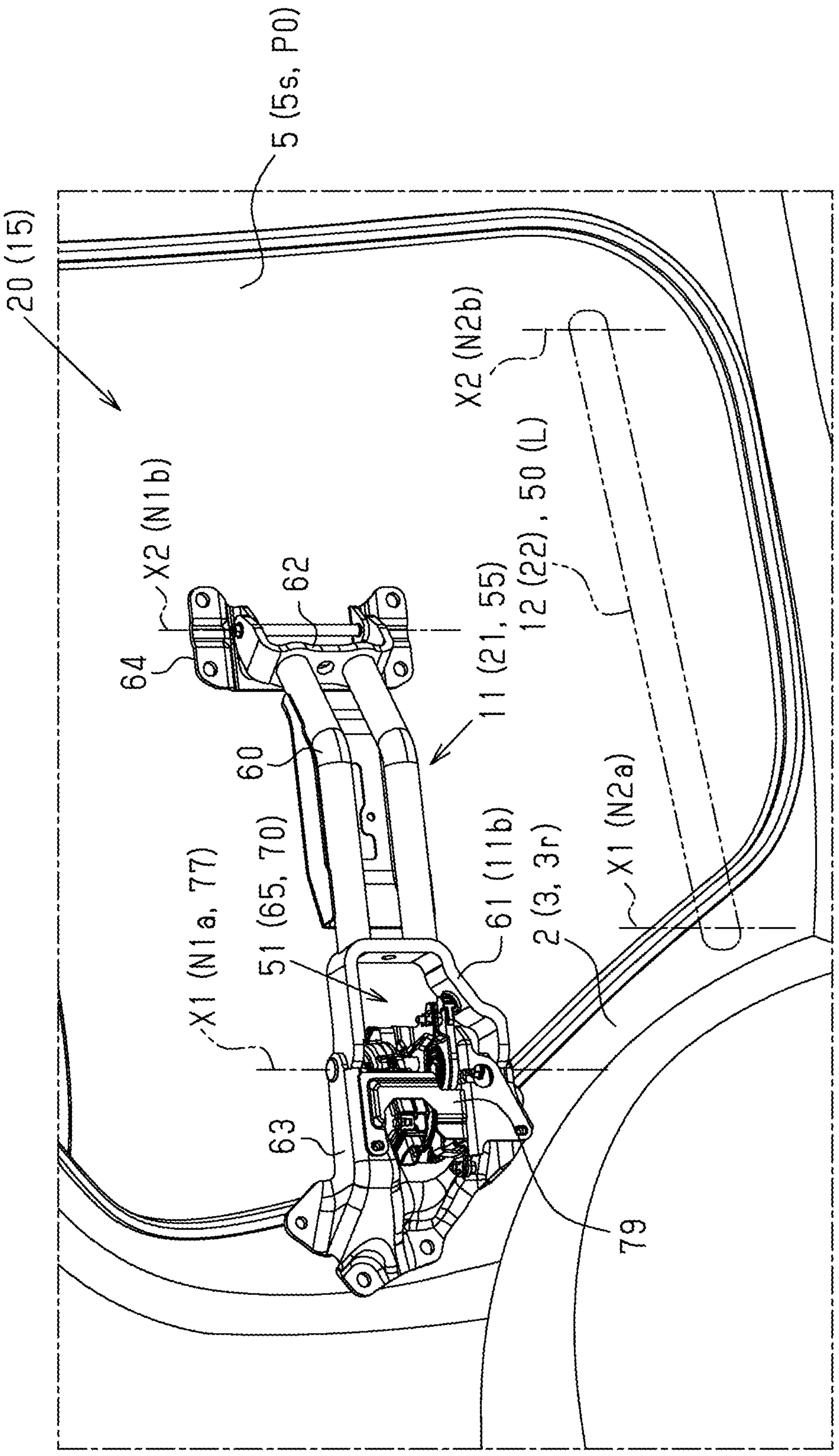
FIG. 8 is a perspective view of the first link arm, which is a drive link of the door device of FIG. 1, and a drive device.
Figure 9:
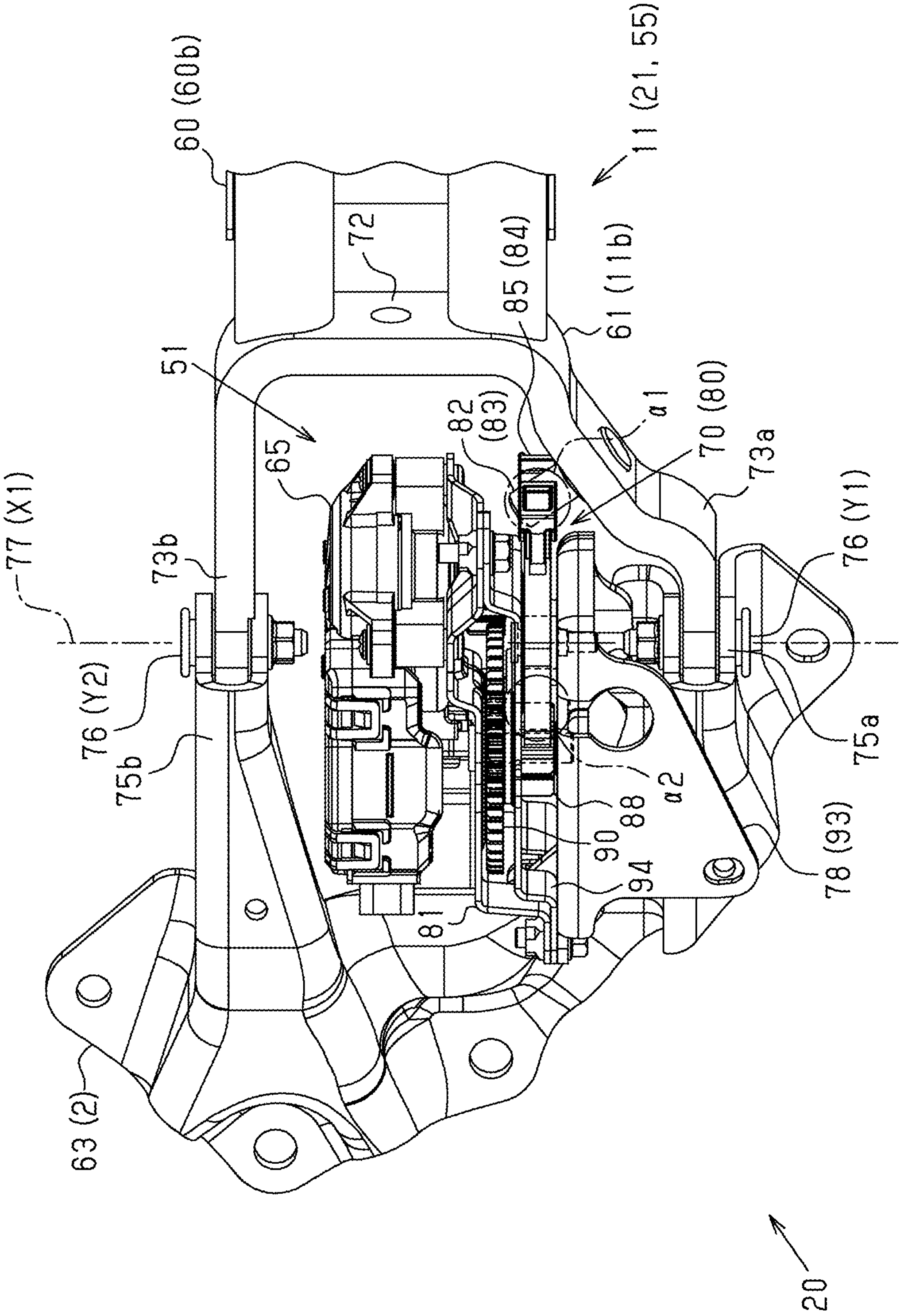
FIG. 9 is a front view of the first link arm, which is the drive link of the door device of FIG. 1, and the drive device.
Figure 10:
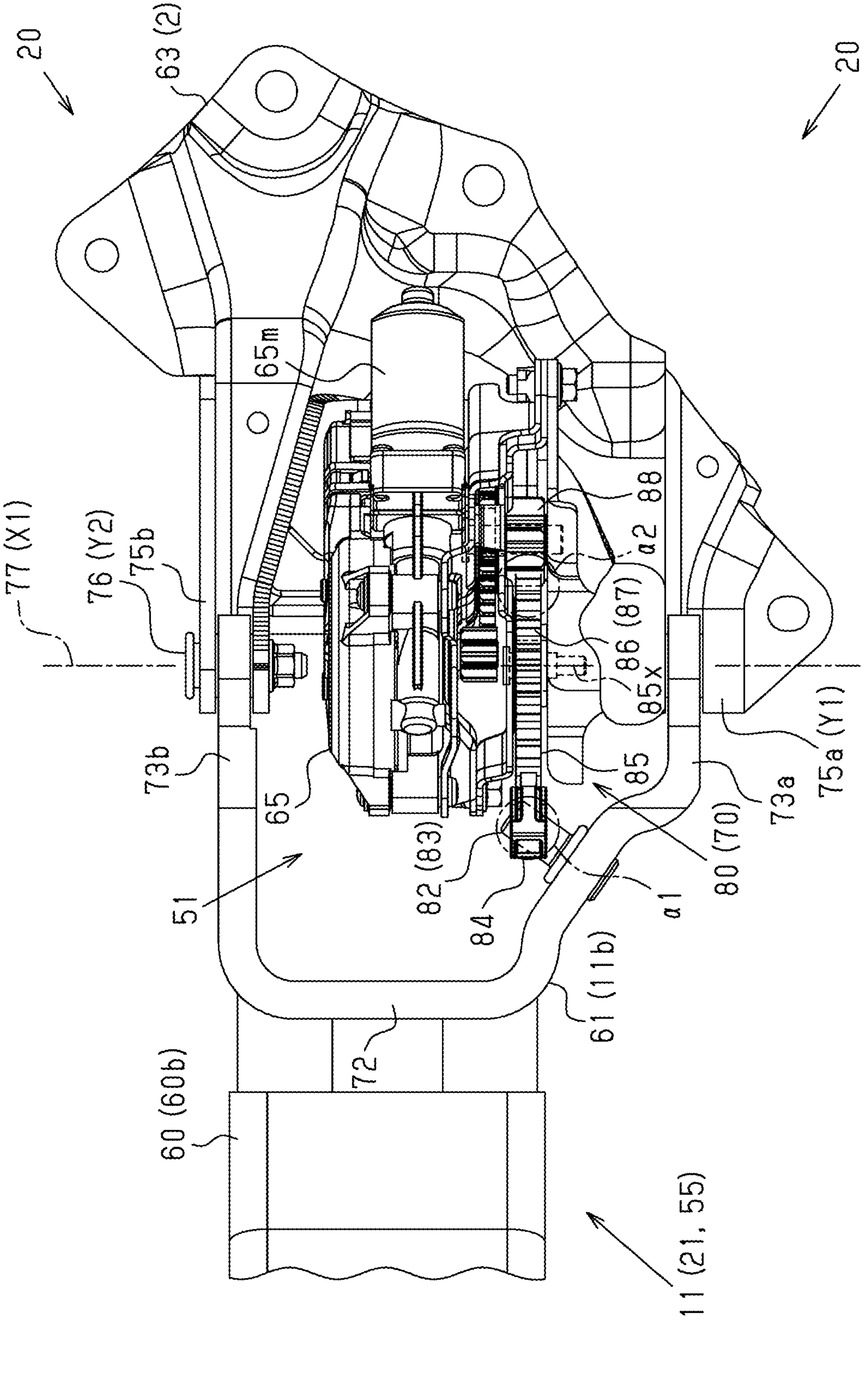
FIG. 10 is a rear view of the first link arm, which is the drive link of the door device of FIG. 1, and the drive device.
Figure 11:
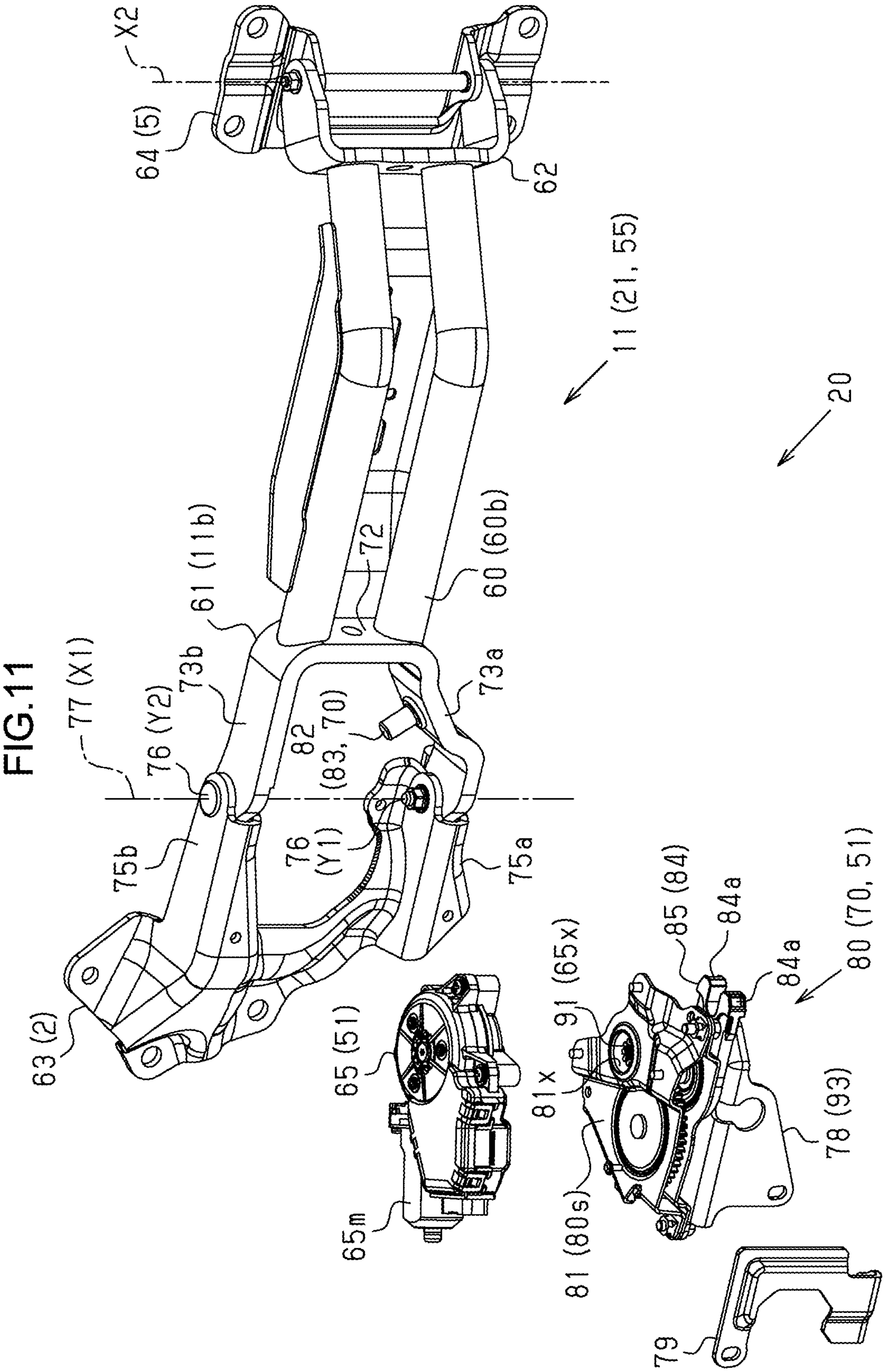
FIG. 11 is an exploded perspective view of the first link arm, which is the drive link of the door device of FIG. 1, and the drive device.

As illustrated in FIGS. 8 and 11, a cover member 79 having an outer shape of a substantially plate shape is fixed to the vehicle body bracket 63 from the vehicle interior side (the front side of the page of FIG. 8). As a result, the vehicle body bracket 63 and the drive device 51 disposed at the first rotary coupling point X1 are protected.

(Transmission Mechanism)

As illustrated in FIGS. 9 to 14, the proximal end bracket 61 constituting the proximal end portion 11*b* of the first link arm 11 is provided with an engagement portion. The engagement portion of the present embodiment is a shaft-shaped engagement portion 82 having a shaft shape extending in the vertical direction. Specifically, the shaft-shaped engagement portion 82 is formed by erecting an engagement pin 83 protruding upward with respect to the first link-side coupling portion 73*a* located on a lower side, among the first and second link-side coupling portions 73*a* and 73*b* constituting the proximal end bracket 61. The engagement pin 83, which is the shaft-shaped engagement portion 82, is provided to the first link-side coupling portion 73*a*, in a state of being inclined (on the right side in FIG. 10) toward the coupling axis 77 of the drive link 55. That is, the engagement pin 83 protrudes inward of the substantially U-shaped proximal end bracket 61, in a state of being inclined in a radial direction of the coupling axis 77.

Further, the door device 20 includes a drive lever 85 which is a drive member. The drive lever 85 has an engagement coupling portion 84 with respect to the engagement pin 83, which is the shaft-shaped engagement portion 82. The drive lever 85 is supported rotatably with respect to the vehicle body 2 coaxially with the coupling axis 77 of the drive link 55. The engagement coupling portion 84 has a pair of engagement claws 84*a* that sandwich the engagement pin 83 in a radial direction of the engagement pin 83. That is, the engagement coupling portion 84 has a so-called crab-claw structure. As a result, the drive lever 85 can transmit the rotation around a support shaft 85*x* with respect to the vehicle body 2 to the proximal end portion 11*b* of the first link arm 11 constituting the drive link 55, via the engagement pin 83 with which the engagement coupling portion 84 is engaged.

The drive lever 85 has a transmission gear portion 86 which is a part of a gear centered on the support shaft 85*x*. The transmission gear portion 86 has a configuration of a sector gear 87.

The door device 20 includes a torque input gear 88, an intermediate gear 90, and a pinion gear 91. The torque input gear 88 is meshed with the transmission gear portion 86 of the drive lever 85.

The intermediate gear 90 integrally rotates with the torque input gear 88, in a state of sharing a support shaft 89. The torque input gear 88 is formed integrally with the support shaft 89. A so-called 12-angle fitting portion 89*x* is formed on a peripheral surface of the support shaft 89. The intermediate gear 90 has a so-called 12-angle fitting hole 90*x* to be fitted to the fitting portion 89*x*.

The pinion gear 91 rotates integrally with an output shaft of the actuator 65 (not illustrated), in a state of being meshed with the intermediate gear 90. As a result, the transmission mechanism 70 transmits a driving torque output from the actuator 65 to the drive link 55.

(Drive Transmission Unit)

The drive transmission unit 80 integrally holds the drive lever 85, the torque input gear 88, and the intermediate gear 90.

Specifically, the drive transmission unit 80 includes a middle bracket 94 disposed between a lower bracket 93 and the upper bracket 81, in addition to the lower bracket 93 and the upper bracket 81 which are the support brackets 78. In the drive transmission unit 80, a support pin 95 bridged between the middle bracket 94 and the lower bracket 93 forms the support shaft 85*x* of the drive lever 85. The support pin 95 may be unrotatably fixed to the middle bracket 94 and the lower bracket 93 so as to rotate relative to the drive lever 85, or may be supported rotatably with respect to the middle bracket 94 and the lower bracket 93 so as to rotate integrally with the drive lever 85. The torque input gear 88 and the support shaft 89 of the intermediate gear 90 are bridged between the lower bracket 93 and the upper bracket 81, in a state of being inserted through an insertion hole 94*x* provided in the middle bracket 94. In this state, the lower bracket 93, the middle bracket 94, and the upper bracket 81 are fastened together to form the drive transmission unit 80.

Figure 12:
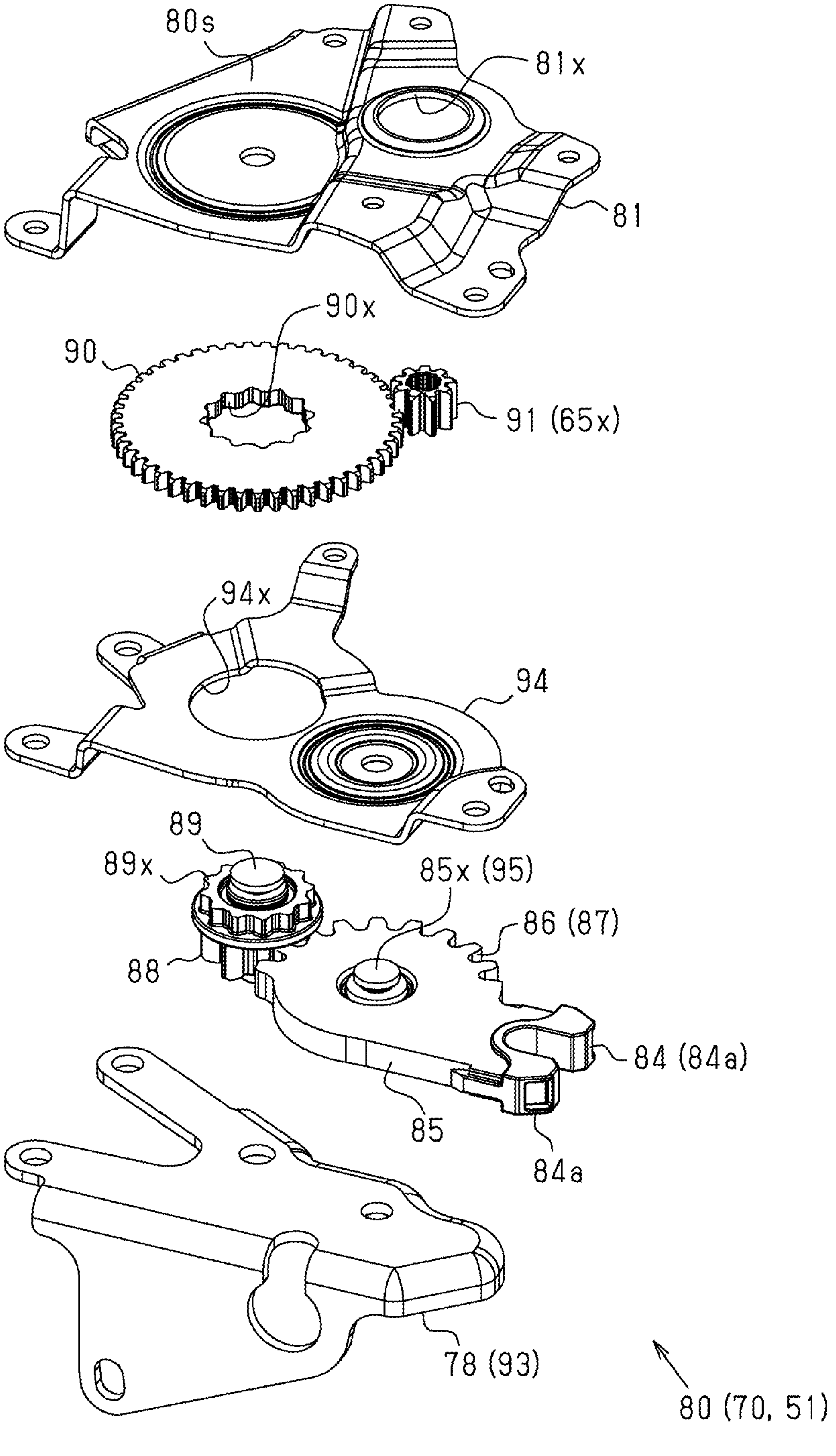
FIG. 12 is an exploded perspective view of a drive transmission unit forming a transmission mechanism of the door device of FIG. 1.
Figure 13:
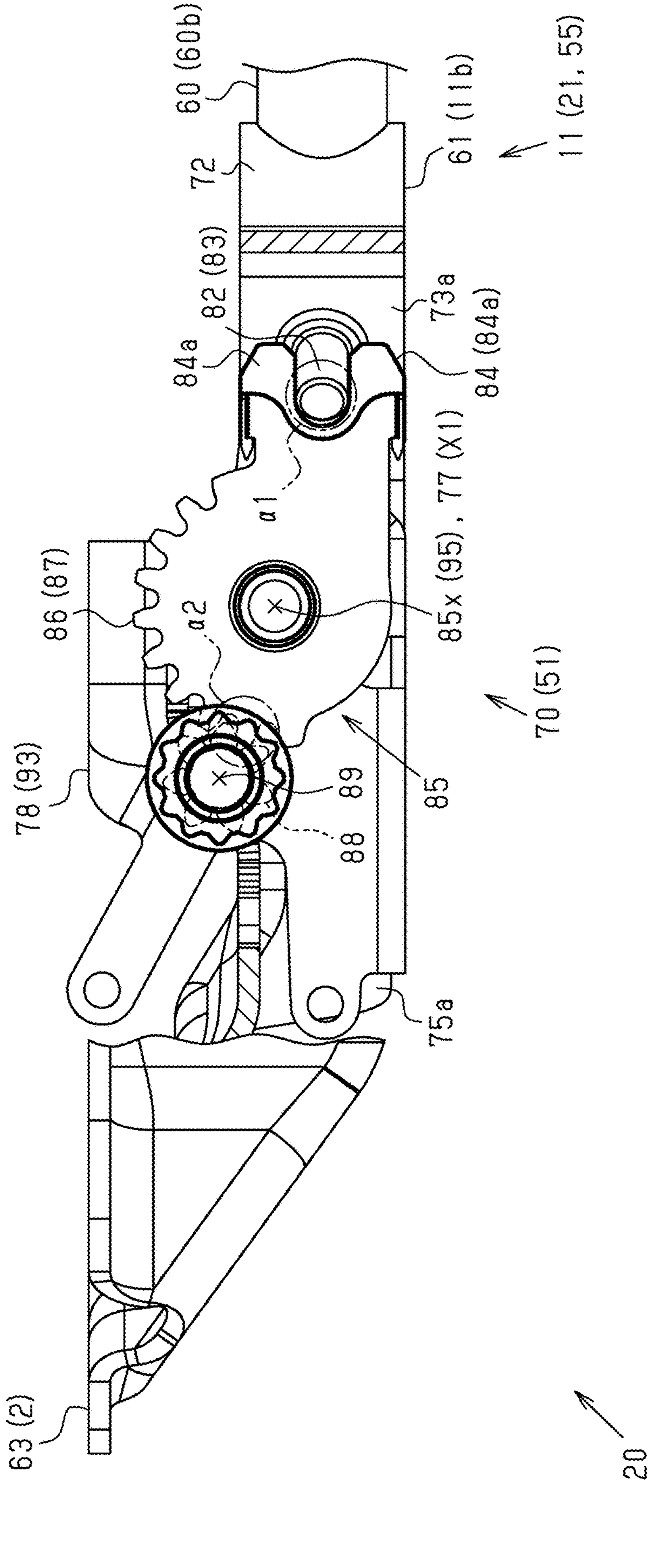
FIG. 13 is a plan view of the drive device of the door device of FIG. 1 when a door is in a full closed state.
Figure 14:
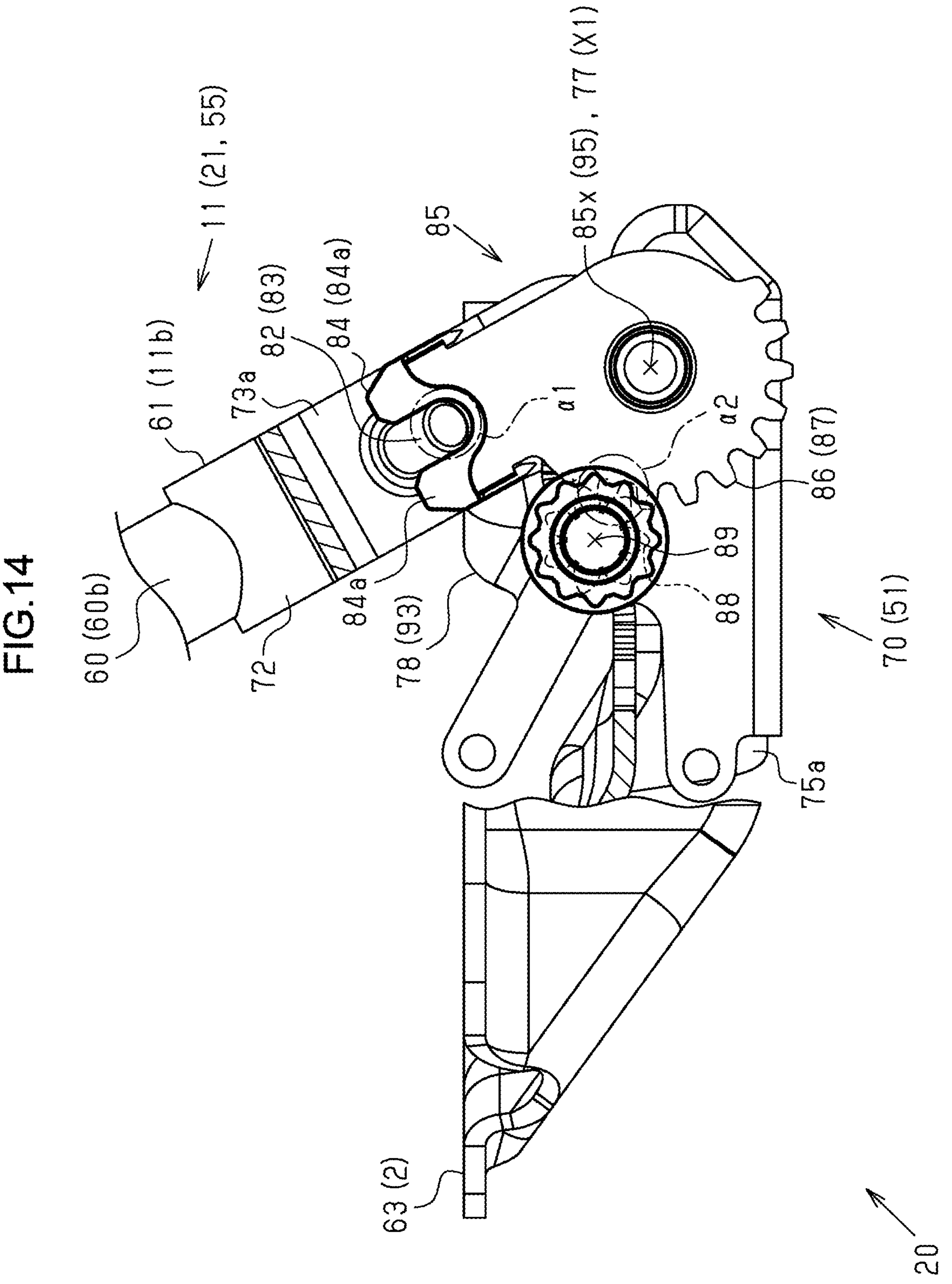
FIG. 14 is a plan view of the drive device of the door device of FIG. 1 when the door is in a full opened state.
Figure 15:
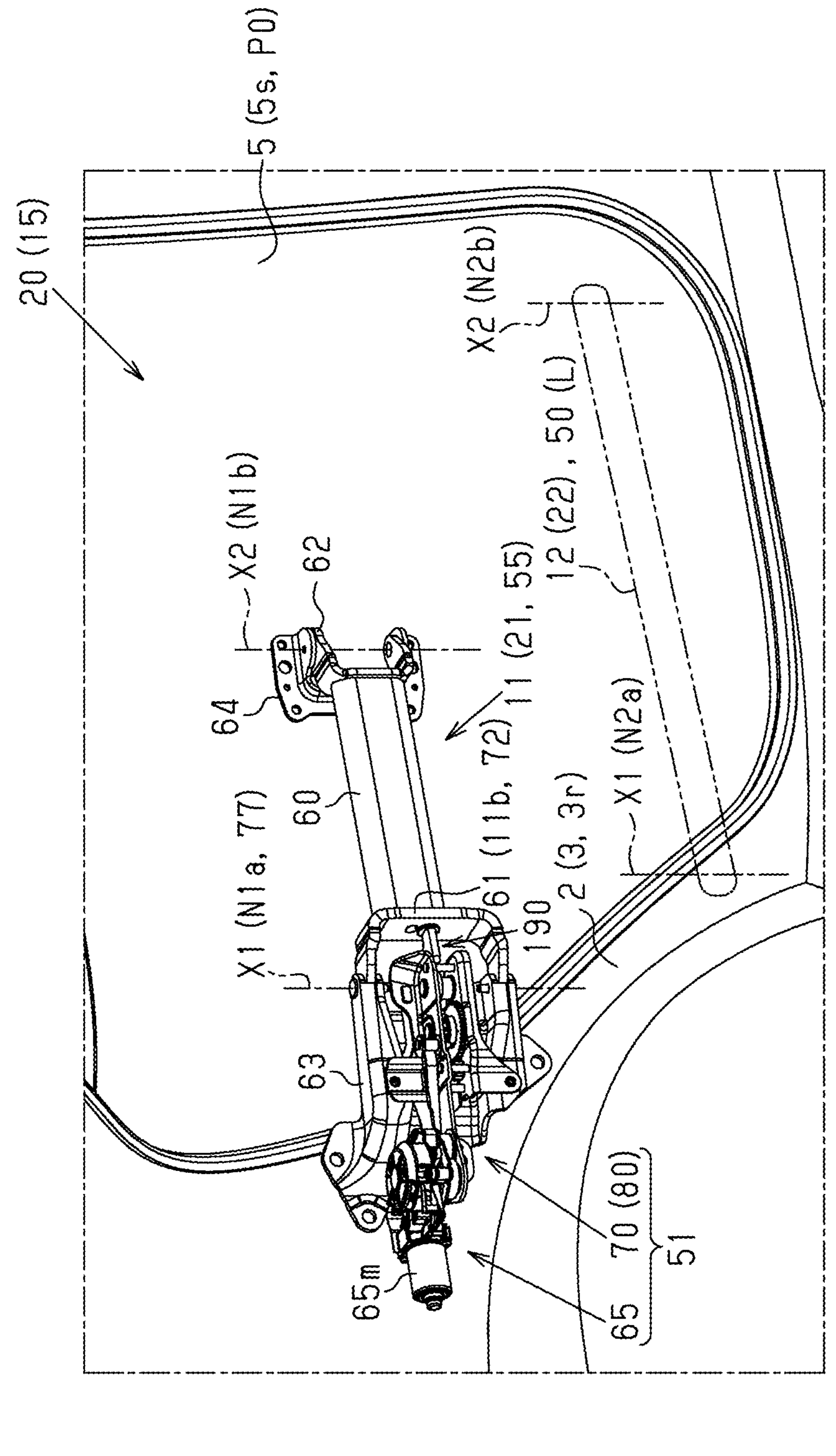
FIG. 15 is a perspective view of a first link arm, which is a drive link of a door device of a second embodiment, and the drive device.
Figure 16:
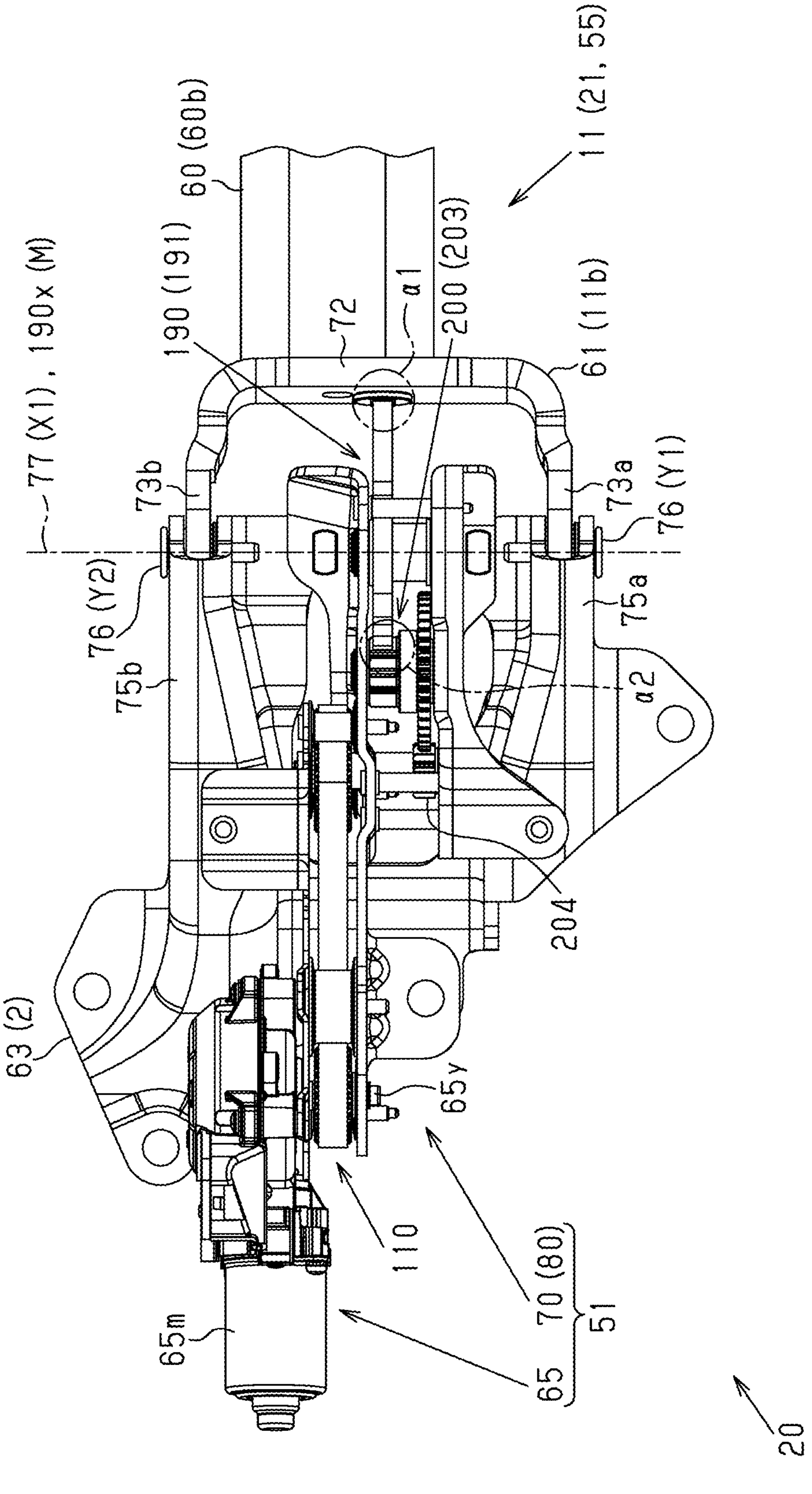
FIG. 16 is a front view of the first link arm, which is the drive link of the door device of FIG. 15, and the drive device.
Figure 17:
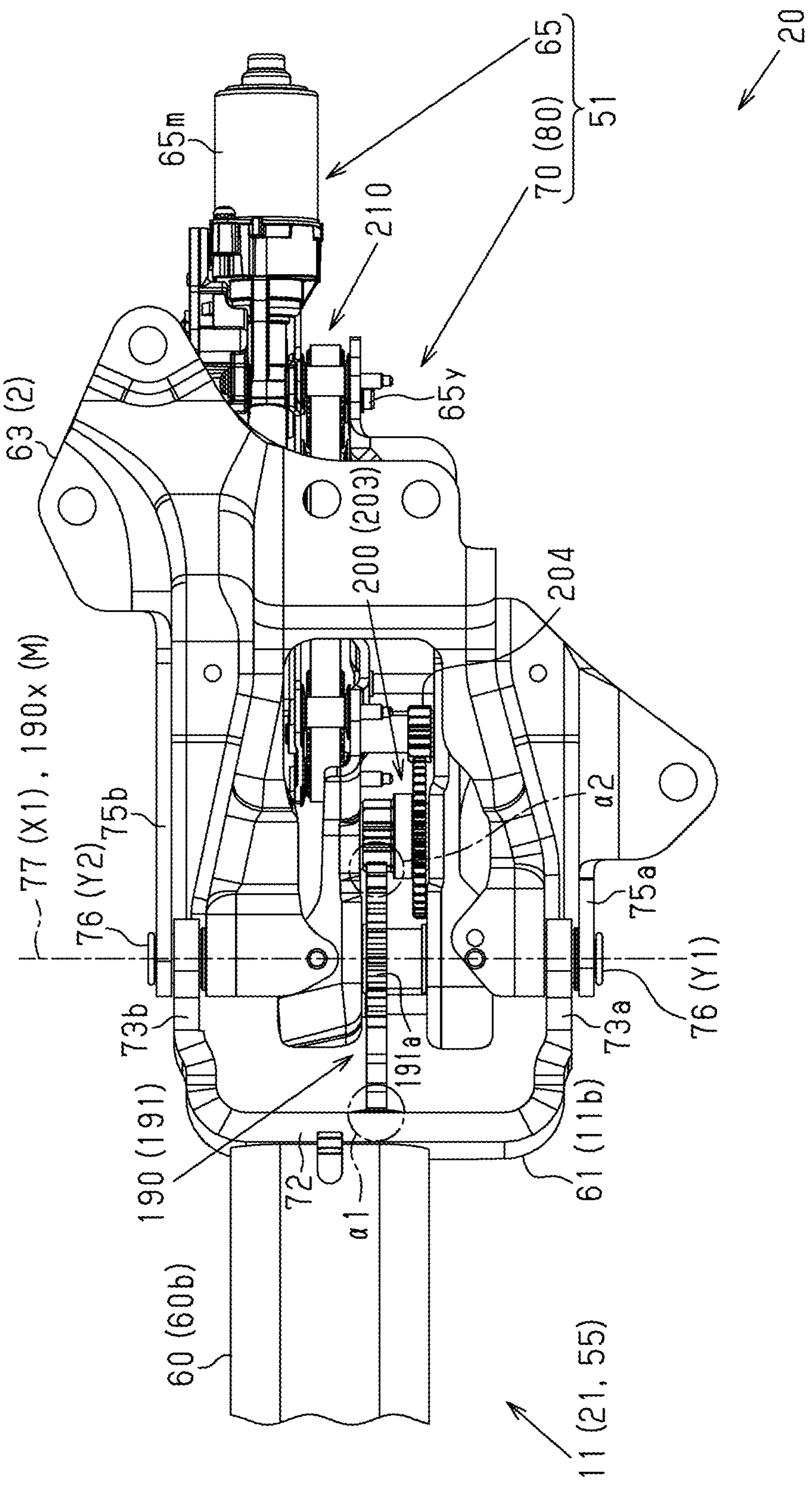
FIG. 17 is a rear view of the first link arm, which is the drive link of the door device of FIG. 15, and the drive device.
Figure 18:
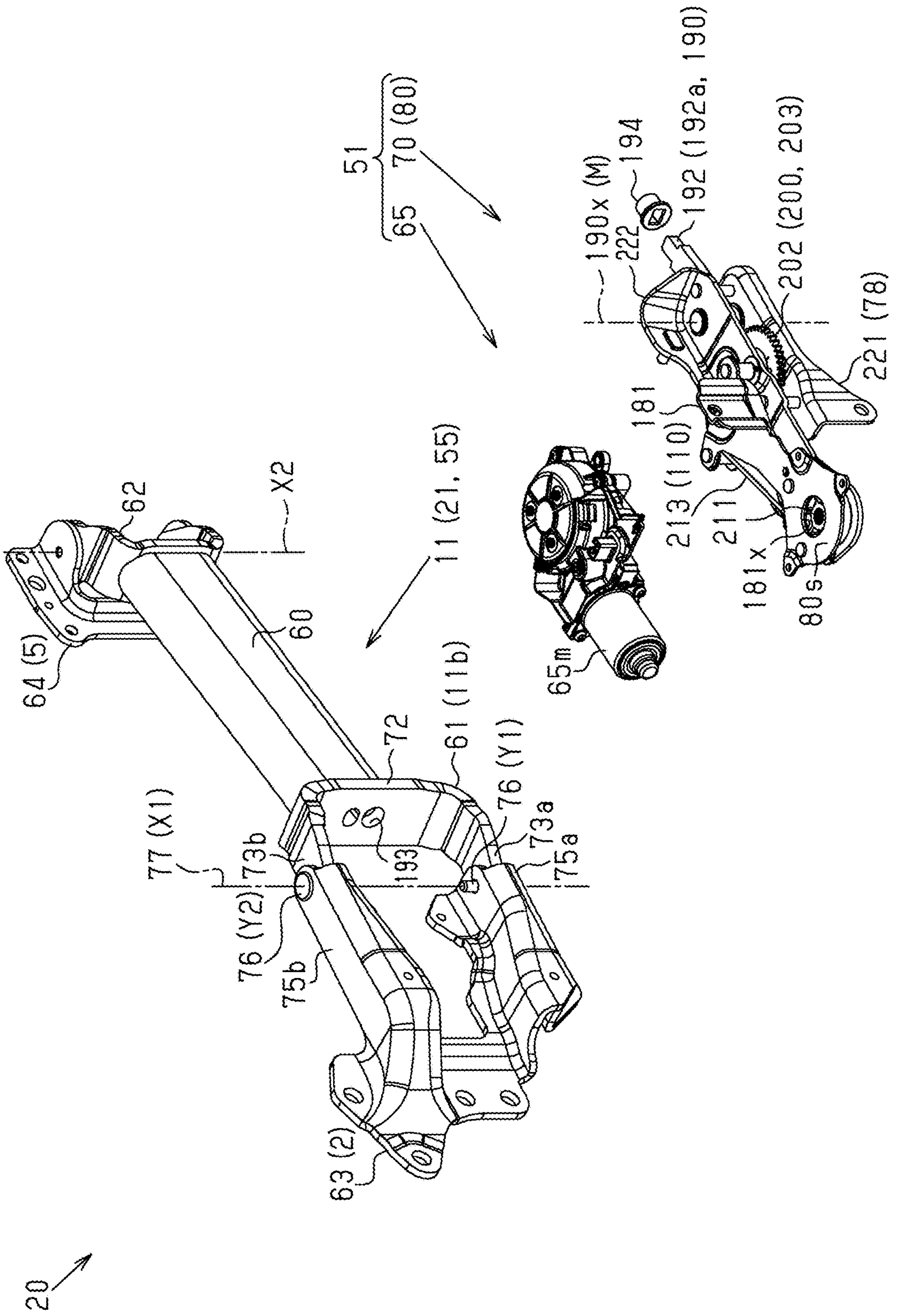
FIG. 18 is an exploded perspective view of the first link arm, which is the drive link of the door device of FIG. 15, and the drive device.
Figure 19:
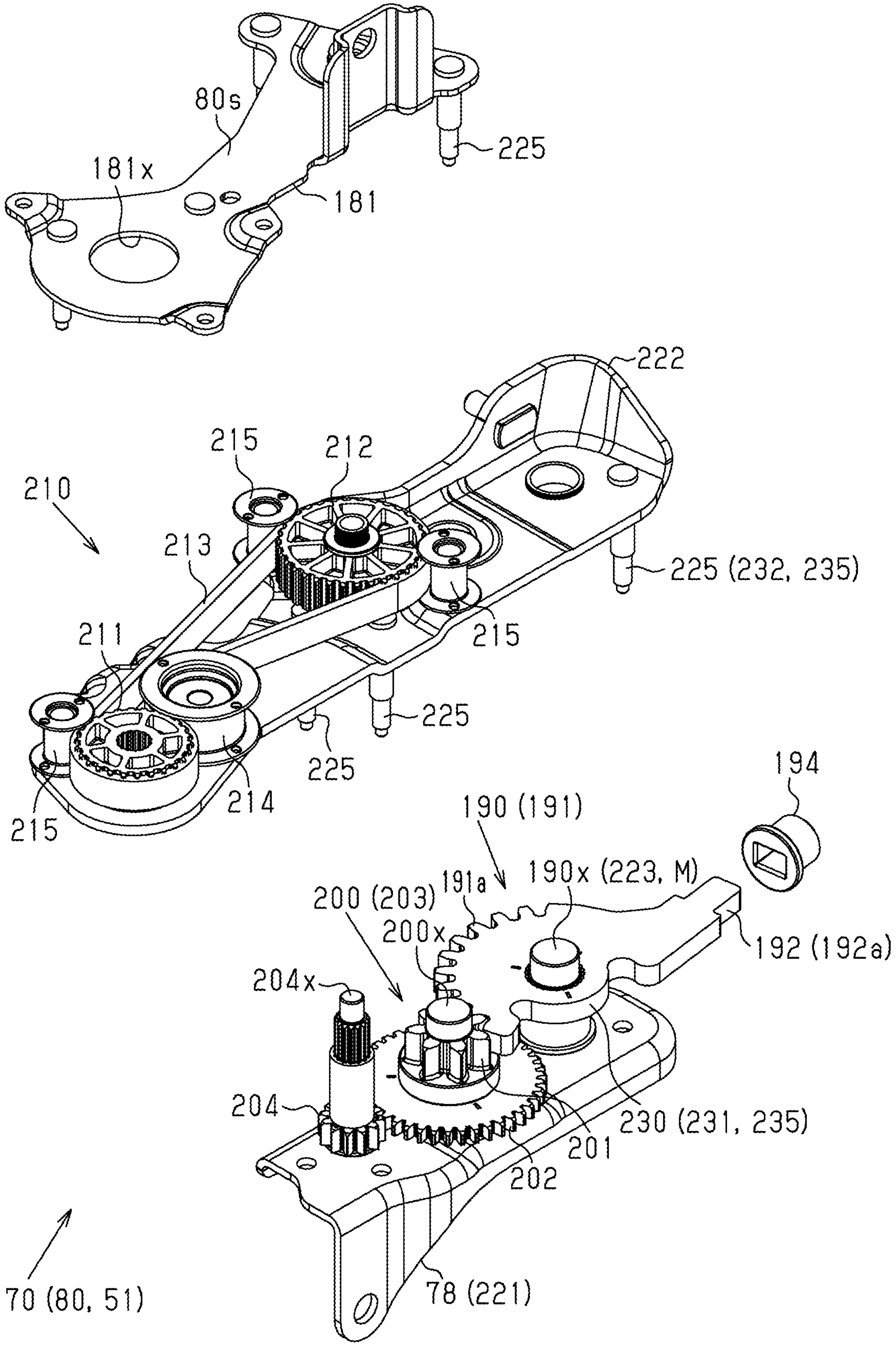
FIG. 19 is an exploded perspective view of a drive transmission unit forming a transmission mechanism of the door device of FIG. 15.

The actuator 65 is fixed to the upper end surface 80*s* of the drive transmission unit 80 in a state where the pinion gear 91 constituting an output portion 65*x* is inserted into an attachment hole 81*x* provided in the upper bracket 81. For convenience of description, FIGS. 11 and 12 illustrate a state in which the pinion gear 91 is meshed with the intermediate gear 90 constituting the drive transmission unit 80. The drive transmission unit 80 is fixed to the vehicle body bracket 63 in a state where the engagement coupling portion 84 of the drive lever 85 protruding from one end of the drive transmission unit 80 is engaged with the engagement pin 83 provided at the proximal end portion 11*b* of the first link arm 11. As a result, the support shaft 85*x* of the drive lever 85 is disposed coaxially with the coupling axis 77 of the drive link 55.

In the door device 20, in this state, a position α1 at which the engagement coupling portion 84 of the drive lever 85 is engaged with the shaft-shaped engagement portion 82 of the drive link 55 is at the same height as a position α2 at which the torque input gear 88 is meshed with the transmission gear portion 86 of the drive lever 85. In other words, the two positions α1 and α2 are disposed at the same position (the same position in the vertical direction in FIGS. 9 and 10) in an axial direction of the coupling axis 77 of the drive link 55 extending in the vertical direction. As a result, the driving torque of the actuator 65 can be efficiently transmitted to the first link arm 11 which is the drive link 55.

(Action)

In the door device 20, the driving torque output from the actuator 65 is transmitted to the torque input gear 88 that rotates integrally with the intermediate gear 90, via the intermediate gear 90 that is meshed with the pinion gear 91 that is the output portion 65*x*. The driving torque of the actuator 65 transmitted to the torque input gear 88 is transmitted to the drive lever 85 via the transmission gear portion 86 that is meshed with the torque input gear 88. When the drive lever 85 rotates around the support shaft 85*x*, the driving torque of the actuator 65 is transmitted to the proximal end portion 11*b* of the first link arm 11, via the engagement pin 83, which is the shaft-shaped engagement portion 82 with which the engagement coupling portion 84 of the drive lever 85 is engaged. As a result, the first link arm 11 which is the drive link 55 rotates around the coupling axis 77 with respect to the vehicle body 2. That is, the door 5 supported by the link mechanism 15 performs the opening and closing operations on the basis of the operation of the link mechanism 15 formed by the first link arm 11.

Next, effects of the present embodiment will be described.

(1-1) The door device 20 of the vehicle 1 includes the first and second link arms 11 and 12 each having the first rotary coupling point X1 with respect to the vehicle body 2 and the second rotary coupling point X2 with respect to the door 5. The door device 20 also includes the drive device 51 that rotates the first link arm 11 to cause the door 5 to perform the opening and closing operations on the basis of an operation of the link mechanism 15 formed by the first and second link arms 11 and 12. The drive device 51 includes the actuator 65 that outputs a driving torque and the transmission mechanism 70 that transmits the driving torque to the drive link 55. The transmission mechanism 70 includes the shaft-shaped engagement portion 82 which is an engagement portion provided to the drive link 55, the support shaft 85*x*, and the drive lever 85 which is a drive member supported rotatably around the support shaft 85*x*. The drive lever 85 has the engagement coupling portion 84 with respect to the shaft-shaped engagement portion 82, and has the transmission gear portion 86 centered on the support shaft 85*x*. Furthermore, the transmission mechanism 70 includes the torque input gear 88 that is input with a driving torque in a state of being meshed with the transmission gear portion 86 of the drive lever 85. Then, in the axial direction of the coupling axis 77 of the drive link 55, the position α1 at which the engagement coupling portion 84 of the drive lever 85 is engaged with the shaft-shaped engagement portion 82 is disposed at the same position as the position α2 at which the torque input gear 88 is meshed with the transmission gear portion 86.

In a case where the position α1 at which the engagement coupling portion 84 of the drive lever 85 is engaged with the shaft-shaped engagement portion 82 is axially shifted from the position α2 at which the torque input gear 88 is meshed with the transmission gear portion 86, a stress for twisting the drive lever 85 is applied to the drive lever 85. However, according to the above configuration, such a load of the drive lever 85 is less likely to occur. As a result, it is possible to ensure high transmission efficiency of the driving torque by maintaining a favorable gear meshing state. In addition, even at a time of manual operation of the door 5, operation resistance can be suppressed to be small, and smooth opening and closing operations can be secured.

(1-2) The engagement portion provided to the drive link 55 is the shaft-shaped engagement portion 82 having a shaft shape. According to the above configuration, the shape of the engagement portion can be simplified.

(1-3) The engagement coupling portion 84 of the drive lever 85 includes the pair of engagement claws 84*a* and 84*a* that sandwich the shaft-shaped engagement portion 82 in a radial direction of the engagement coupling portion 84.

By adopting such a so-called crab-claw structure, the engagement coupling portion 84 of the drive lever 85 can be easily engaged with the shaft-shaped engagement portion 82. Then, a rotational operation of the drive lever 85 can be efficiently transmitted to the drive link 55 in both directions around the support shaft 85*x*, on the basis of the engagement shape with respect to the shaft-shaped engagement portion 82.

(1-4) The support shaft 85*x* of the drive lever 85 is provided coaxially with the coupling axis 77 of the drive link 55 for the vehicle body 2.

According to the above configuration, the driving torque can be transmitted more efficiently. Furthermore, for example, an inclination of the shaft-shaped engagement portion 82 in a radial direction of the coupling axis 77 can be allowed, such as a configuration in which the shaft-shaped engagement portion 82 is inclined toward the coupling axis 77 of the drive link 55. As a result, a degree of freedom in designing the arrangement of the shaft-shaped engagement portion 82, the shape of the drive link 55, and the like can be increased, and mountability on the vehicle 1 can be improved.

(1-5) The drive link 55 is coupled to the vehicle body 2 by rotatably coupling the first and second link-side coupling portions 73*a* and 73*b* to the first and second vehicle-body-side coupling portions 75*a* and 75*b*, respectively, at the first position Y1 and the second position Y2 separated from each other in the axial direction of the coupling axis 77. In the axial direction of the coupling axis 77, the drive device 51 is disposed between the first position Y1 at which the first link-side coupling portion 73*a* and the first vehicle-body-side coupling portion 75*a* are coupled to each other and the second position Y2 at which the second link-side coupling portion 73*b* and the second vehicle-body-side coupling portion 75*b* are coupled to each other.

According to the above configuration, the drive device 51 can be compactly disposed with respect to the drive link 55. As a result, high mountability to the vehicle 1 can be secured. Then, the position α1 at which the engagement coupling portion 84 of the drive lever 85 is engaged with the shaft-shaped engagement portion 82 can be easily disposed at the same axial position as the position α2 at which the torque input gear 88 is meshed with the transmission gear portion 86. Furthermore, the first and second vehicle-body-side coupling portions 75*a* and 75*b* function as a protective member of the transmission mechanism 70. As a result, it is possible to expand a vehicle compartment space that can be efficiently used in the vicinity of the drive device 51.

Second Embodiment

Next, a second embodiment related to a vehicle door device will be described with reference to FIGS. 15 to 21. For convenience of description, even if shapes illustrated in the drawings are slightly different, configurations having the same function are denoted by the same reference numerals as those in the first embodiment above, and description thereof is omitted.

(Transmission Mechanism)

As illustrated in FIGS. 15 to 21, a door device 20 includes a link drive gear 190 which is a drive member. The link drive gear 190 is fixed to a first link arm 11 which is a drive link 55, in a state of having a support shaft 190*x* which is a rotation center M coaxially with a coupling axis 77 of the drive link 55 for a vehicle body 2. The link drive gear 190 has a configuration of a sector gear 191 having a gear tooth 191*a* in a part of a circumferential range centered on the support shaft 190*x*. The part of the link drive gear 190 where the gear tooth 191*a* is provided constitutes a transmission gear portion. The link drive gear 190 also includes a coupling protrusion 192 protruding in a radial direction of the link drive gear 190. In the link drive gear 190, the coupling protrusion 192 which is an engagement coupling portion is fixed to a proximal end bracket 61 constituting a proximal end portion 11*b* of the first link arm 11. Specifically, a base portion 72 of the proximal end bracket 61 is provided with an attachment hole 193 which is an engagement portion. The coupling protrusion 192 of the link drive gear 190 is fixed in a state where a distal end portion 192*a* is inserted into the attachment hole 193 via a bush 194 having a substantially cylindrical shape. The link drive gear 190 rotates integrally with the drive link 55 around the coupling axis 77 in a state where the support shaft 190*x*, which is the rotation center M, is disposed coaxially with the coupling axis 77 of the drive link 55 for the vehicle body 2.

The door device 20 includes a torque input gear 200 that is meshed with the link drive gear 190, a pinion gear 204 that is meshed with the torque input gear 200, and a pulley device 210.

The torque input gear 200 has a configuration of a two-stage gear 203 including a first gear portion 201 and a second gear portion 202 that integrally rotate coaxially. Furthermore, the torque input gear 200 is supported rotatably around a support shaft 200*x* shared by the first gear portion 201 and the second gear portion 202, in a state where the first gear portion 201 is disposed above the second gear portion 202. In the torque input gear 200, in this state, the first gear portion 201 is meshed with the link drive gear 190 having a configuration of the sector gear 191.

The pinion gear 204 is meshed with the second gear portion 202 of the torque input gear 200. The pulley device 210 transmits a driving torque of an actuator 65 to a support shaft 204*x* that rotates integrally with the pinion gear 204.

The pulley device 210 includes a driving pulley 211 that integrally rotates in a state of being fixed to an output shaft 65*y* of the actuator 65, and a driven pulley 212 that integrally rotates in a state of being fixed to the support shaft 204*x* of the pinion gear 204. The pulley device 210 includes a drive belt 213 wound around the driving pulley 211 and the driven pulley 212. The pulley device 210 further includes an auxiliary pulley 214 that applies a pressure to an annular shape of the drive belt 213, and a plurality of guide rollers 215 that sandwich the drive belt 213 between the driving pulley 211 and the driven pulley 212. As a result, the driving torque of the actuator 65 can be stably transmitted to a position separated from the output shaft 65*y* of the actuator 65.

That is, in the door device 20, the driving torque output from the actuator 65 is transmitted to the pinion gear 204 via the pulley device 210. Rotation of the pinion gear 204 is transmitted to the link drive gear 190 via the torque input gear 200 having the second gear portion 202 that is meshed with the pinion gear 204 and the first gear portion 201 that is meshed with the link drive gear 190. As a result, the first link arm 11, which is the drive link 55, rotates around the coupling axis 77 with respect to the vehicle body 2 integrally with the link drive gear 190. That is, a transmission mechanism 70 transmits the driving torque of the actuator 65 to the drive link 55.

(Drive Transmission Unit)

A drive transmission unit 80 integrally holds the link drive gear 190, the torque input gear 200, the pinion gear 204, and the pulley device 210 constituting the transmission mechanism 70 as described above.

Specifically, the drive transmission unit 80 includes a middle bracket 222 disposed between a lower bracket 221 and an upper bracket 181, in addition to the lower bracket 221 and the upper bracket 181 which are the support brackets 78. In the drive transmission unit 80, the support shaft 190*x* of the link drive gear 190 is formed by a support pin 223 bridged between the middle bracket 222 and the lower bracket 221. The support pin 223 may be unrotatably fixed to the lower bracket 221 and the middle bracket 222 so as to rotate relative to the link drive gear 190, or may be supported rotatably with respect to the lower bracket 221 and the middle bracket 222 so as to rotate integrally with the link drive gear 190. Similarly, in the torque input gear 200, the support shaft 200*x* is bridged between the middle bracket 222 and the lower bracket 221. The support shaft 204*x* of the pinion gear 204 that is meshed with the second gear portion 202 of the torque input gear 200 is bridged between the lower bracket 221 and the upper bracket 181, in a state of being inserted through an insertion hole (not illustrated) provided in the middle bracket 222.

In the drive transmission unit 80, the pulley device 210 is formed between the middle bracket 222 and the upper bracket 181. Specifically, the actuator 65 is fixed to an upper end surface 80*s* of the drive transmission unit 80 in a state where the output shaft 65*y* is inserted into an attachment hole 181*x* provided in the upper bracket 181 and a support hole (not illustrated) provided in the middle bracket 222. As a result, the driving pulley 211 fixed to the output shaft 65*y* of the actuator 65 is disposed between the middle bracket 222 and the upper bracket 181.

Similarly, the driven pulley 212 sharing the support shaft 204*x* with the pinion gear 204 is also fixed to the support shaft 204*x* of the pinion gear 204, at a position between the middle bracket 222 and the upper bracket 181. The auxiliary pulley 214 and the guide rollers 215 each also include a support shaft (not illustrated) bridged between the middle bracket 222 and the upper bracket 181.

Furthermore, in the drive transmission unit 80, the lower bracket 221 and the middle bracket 222 are fixed to each other via a plurality of coupling pins 225, and the middle bracket 222 and the upper bracket 181 are fixed to each other via a plurality of coupling pins 225. As a result, components of the transmission mechanism 70 are rotatably supported individually at positions between the lower bracket 221, the middle bracket 222, and the upper bracket 181.

In the door device 20, in this state, a position α1 at which the coupling protrusion 192 of the link drive gear 190 is engaged with the attachment hole 193 of the drive link 55 is at the same height as a position α2 at which the first gear portion 201 of the torque input gear 200 is meshed with the sector gear 191 of the link drive gear 190. In other words, the two positions α1 and α2 are disposed at the same position (the same position in the vertical direction in FIGS. 16 and 17) in an axial direction of the coupling axis 77 of the drive link 55 extending in the vertical direction. As a result, the driving torque of the actuator 65 can be efficiently transmitted to the first link arm 11 which is the drive link 55.

(Optimal Design)

Figure 20:
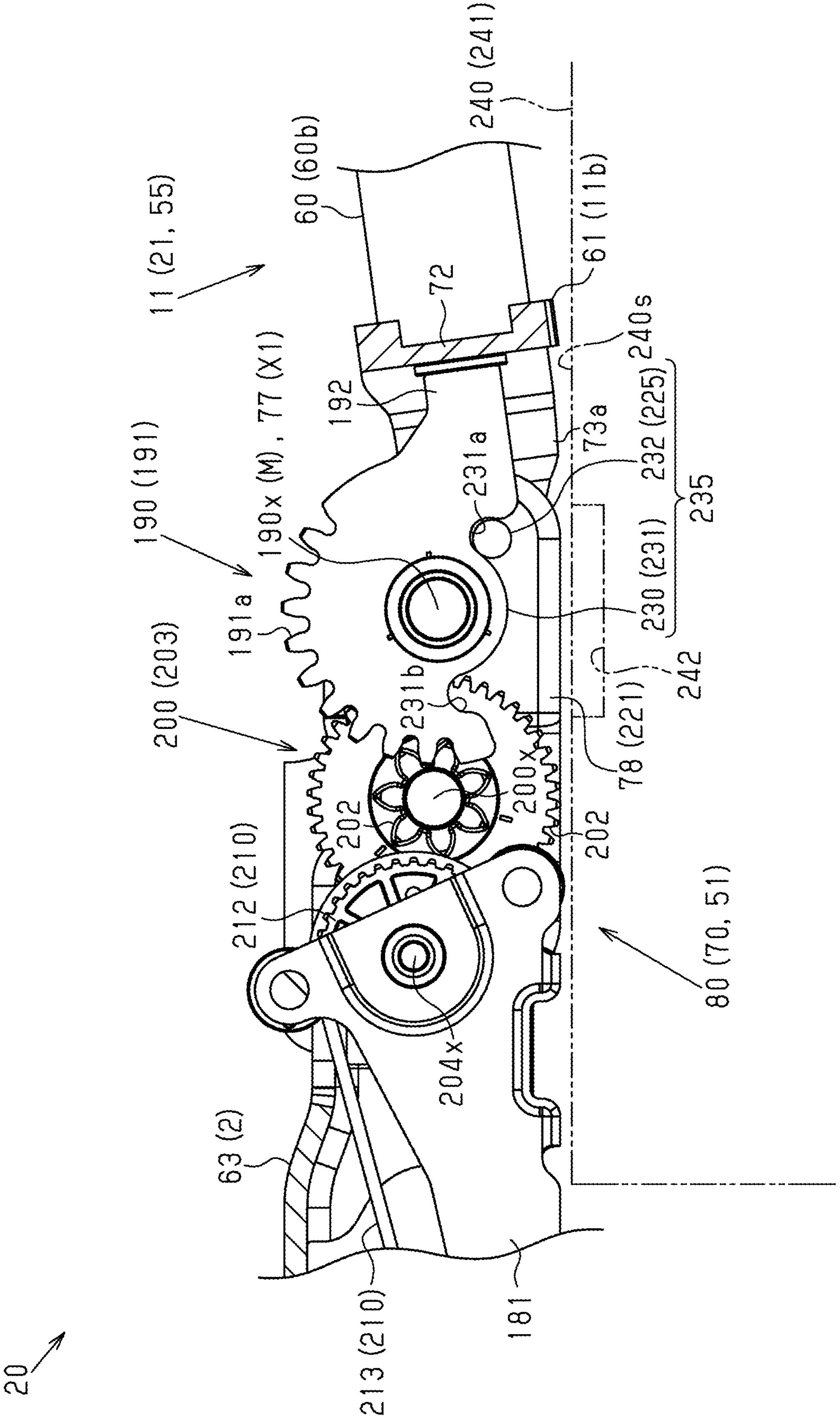
FIG. 20 is a plan view of the drive device of the door device of FIG. 15 when a door is in a full closed position.
Figure 21:
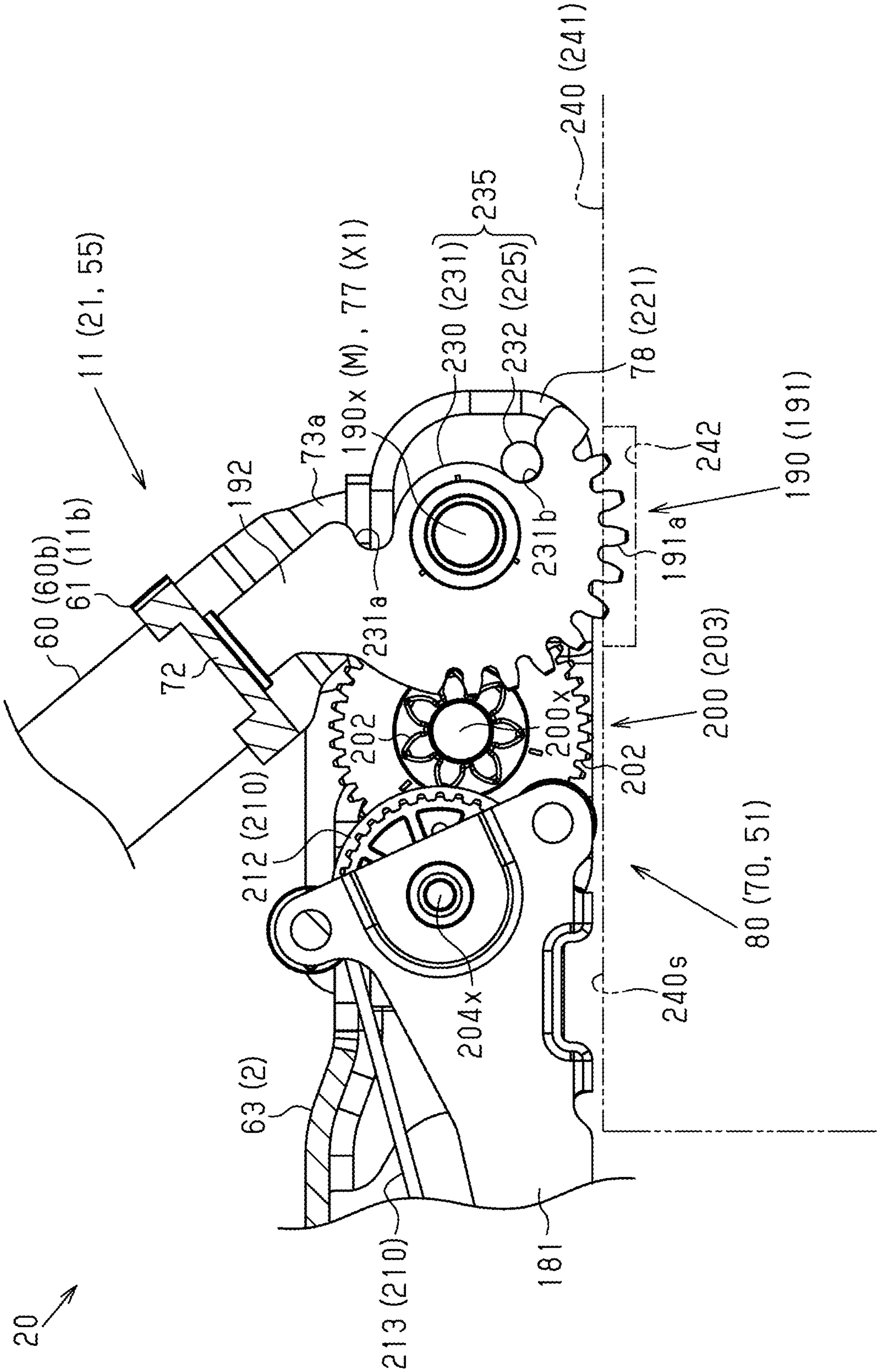
FIG. 21 is a plan view of the drive device of the door device of FIG. 15 when the door is at a full opened position.

As illustrated in FIGS. 20 and 21, in the door device 20, the support shaft 190*x* of the link drive gear 190 and the support shaft 200*x* of the torque input gear 200 constituting the transmission mechanism 70 are arranged side by side in the vehicle front-rear direction. In the link drive gear 190, when a door 5 supported by the first link arm 11 which is the drive link 55 is at a full closed position P0, the coupling protrusion 192 of the link drive gear 190 fixed to the proximal end portion 11*b* extends in the vehicle front-rear direction.

In FIGS. 20 and 21, the horizontal direction is the vehicle front-rear direction, and the vertical direction is the vehicle width direction. In each figure, the upper side is an outer side in the vehicle width direction, that is, a vehicle exterior side, and the upper side is an inner side in the vehicle width direction, that is, a vehicle interior side.

The link drive gear 190 constituting the transmission mechanism 70 has a cutout portion 230, in a circumferential range without the gear tooth 191*a* of the sector gear 191 in a circumferential range centered on the support shaft 190*x*. Specifically, the cutout portion 230 is formed by cutting out the link drive gear 190 in a radial direction. The link drive gear 190 has a substantially semicircular planar shape due to the cutout portion 230.

The coupling protrusion 192 described above is provided at an end position in a circumferential direction of the cutout portion 230. Further, in the door device 20, when the door 5 is at the full closed position P0, the gear tooth 191*a* of the link drive gear 190 having the configuration of the sector gear 191 forming the transmission mechanism 70 of the drive device 51 face the vehicle exterior side. In other words, at this time, the gear tooth 191*a* of the link drive gear 190 does not face the vehicle interior side. As a result, with the opening and closing operations of the door 5 between the full closed position P0 and a full opened position P1, the link drive gear 190 rotates around the support shaft 190*x* while a meshing position of the torque input gear 200 with respect to the gear tooth 191*a* of the sector gear 191 is displaced.

That is, the door device 20 causes the drive link 55 to perform the opening operation (rotate counterclockwise in each figure) from a state in which the door 5 is supported at the full closed position P0, on the basis of the driving torque transmitted to the link drive gear 190 via the torque input gear 200. Then, the door device 20 can cause the drive link 55 supporting the door 5 brought into the opening operation state to perform the closing operation (rotate clockwise in each figure) to the full closed position P0.

Further, when the door 5 is at the full closed position P0, the cutout portion 230 provided in the link drive gear 190 having the configuration of the sector gear 191 forming the transmission mechanism 70 of the drive device 51 faces the vehicle interior side. As a result, when the door 5 is at the full closed position P0, the link drive gear 190 does not protrude toward the vehicle interior side, from the support bracket 78 of the drive transmission unit 80 fixed to a vehicle body bracket 63.

The link drive gear 190 has an engagement recess 231 extending in a circumferential direction and provided in the cutout portion 230. Specifically, the engagement recess 231 has a substantially arc planar shape extending in the circumferential direction centered on the support shaft 190*x* of the link drive gear 190. The door device 20 further includes a shaft-shaped engagement protrusion 232 disposed in the engagement recess 231, in a state of being fixed to the vehicle body 2. In the present embodiment, the coupling pin 225 interposed between the lower bracket 221 and the middle bracket 222 of the drive transmission unit 80 functions as the engagement protrusion 232. The engagement recess 231 and the engagement protrusion 232 form a stopper mechanism 235 that restricts rotation of the link drive gear 190, that is, restricts an opening/closing operation range of the drive link 55 that supports the door 5.

That is, when the link drive gear 190 disposed coaxially with the coupling axis 77 of the drive link 55 for the vehicle body 2 rotates around the support shaft 190*x*, the engagement protrusion 232 apparently moves in the circumferential direction in the engagement recess 231 of the link drive gear 190. Specifically, when the door 5 supported by the first link arm 11 which is the drive link 55 is at the full closed position P0 due to the apparent circumferential movement accompanying the rotation of the link drive gear 190, the engagement protrusion 232 is arranged in the vicinity of a first end portion 231*a* of the engagement recess 231. Further, when the door 5 supported by the first link arm 11 which is the drive link 55 is at the full opened position P1 due to the apparent circumferential movement accompanying the rotation of the link drive gear 190, the engagement protrusion 232 is arranged in the vicinity of a second end portion 231*b* of the engagement recess 231. As a result, the stopper mechanism 235 restricts the rotation of the link drive gear 190 within a range in which relative displacement of the engagement protrusion 232 in an extending direction of the engagement recess 231 is allowed.

In the torque input gear 200 having the configuration of the two-stage gear 203, the second gear portion 202 that is meshed with the pinion gear 204 has a larger outer diameter than the first gear portion 201 that is meshed with the link drive gear 190. In other words, the second gear portion 202 on an input side on which the driving torque is input via the pinion gear 204 has a larger outer diameter than the first gear portion 201 on an output side from which the driving torque is output to the link drive gear 190. Furthermore, the second gear portion 202 of the torque input gear 200 does not protrude toward the vehicle interior side from the support bracket 78 of the drive transmission unit 80 fixed to the vehicle body bracket 63. Accordingly, when the door 5 is at the full closed position P0, the link drive gear 190 does not protrude toward the vehicle interior side from the second gear portion 202 of the torque input gear 200.

In a vehicle 1, an impact-absorbing member 241 which is an interior member 240 is disposed at a position on the vehicle interior side adjacent to the vehicle body bracket 63. Note that the impact-absorbing member 241 is a so-called “EA pad” or the like, and is formed using, for example, a urethane material. Furthermore, the door device 20 is configured such that the gear tooth 191*a* of the link drive gear 190, which is the sector gear 191 and is fixed to the proximal end portion 11*b* of the first link arm 11 constituting the drive link 55, faces the vehicle interior side on the basis of the opening operation of the door 5. In the door device 20, the gear tooth 191*a* of the sector gear 191 brought into a state of facing the vehicle interior side on the basis of the opening operation of the door 5 protrude to the vehicle interior side from the support bracket 78 of the drive transmission unit 80 fixed to the vehicle body bracket 63. At this time, the gear tooth 191*a* of the sector gear 191 protrude to the vehicle interior side from the vehicle body bracket 63 that supports the drive transmission unit 80 constituting the transmission mechanism 70 on the vehicle body 2, more specifically, from the first vehicle-body-side coupling portion 75*a*. In an opposed surface 240*s* of the interior member 240 above, a groove-shaped insertion recess 242 is provided. The gear tooth 191*a* of the sector gear 191 is disposed inside the insertion recess 242 when facing the vehicle interior side on the basis of the opening operation of the door 5.

(Action)

Normally, the door 5 of the vehicle 1 is held for the longest time in a state where the door 5 is at the full closed position P0, that is, in the full closed state. Based on this point, a configuration is adopted in which the sector gear 191 having the gear tooth 191*a* in a part of the circumferential range is used for the link drive gear 190 that rotates integrally with the drive link 55 supporting the door 5, and the gear tooth 191*a* faces the vehicle exterior side when the door 5 is at the full closed position P0. As a result, it becomes difficult for the link drive gear 190 to protrude toward the vehicle interior side. Then, foreign matter is less likely to interfere with the gear tooth 191*a*.

Next, effects of the present embodiment will be described. The present embodiment has the following effects in addition to the same effects as the effects described in (1-5) of the first embodiment above.

(2-1) The door device 20 of the vehicle 1 includes the first and second link arms 11 and 12 each having the first rotary coupling point X1 with respect to the vehicle body 2 and the second rotary coupling point X2 with respect to the door 5 of the vehicle 1. The door device 20 also includes the drive device 51 that rotates the first link arm 11, which is the drive link 55, to cause the door 5 to perform opening and closing operations on the basis of an operation of the link mechanism 15 formed by the first and second link arms 11 and 12. The drive device 51 includes the actuator 65 that outputs a driving torque and the transmission mechanism 70 that transmits the driving torque to the drive link 55. The transmission mechanism 70 includes: the link drive gear 190 fixed to the drive link 55 with the rotation center M at a position coaxial with the coupling axis 77 of the drive link 55 for the vehicle body 2; and the torque input gear 200 that is input with a driving torque in a state of being meshed with the link drive gear 190. In the axial direction of the coupling axis 77 of the drive link 55, the position α1 at which the coupling protrusion 192 of the link drive gear 190 is engaged with the attachment hole 193 is disposed at the same position as the position α2 at which the first gear portion 201 of the torque input gear 200 is meshed with the sector gear 191 of the link drive gear 190.

In a case where the position α1 at which the coupling protrusion 192 of the link drive gear 190 is engaged with the attachment hole 193 is axially shifted from the position α2 at which the first gear portion 201 of the torque input gear 200 is engaged with the sector gear 191, a stress for twisting the link drive gear 190 is applied to the link drive gear 190. However, according to the above configuration, such a load of the link drive gear 190 is less likely to occur. As a result, it is possible to ensure high transmission efficiency of the driving torque by maintaining a favorable gear meshing state. In addition, even at a time of manual operation of the door 5, operation resistance can be suppressed to be small, and smooth opening and closing operations can be secured.

(2-2) The link drive gear 190 has the configuration of the sector gear 191 having the gear tooth 191*a* in a part of the circumferential range. The link drive gear 190 is configured such that the gear tooth 191*a* of the sector gear 191 faces the vehicle exterior side when the door 5 supported by the drive link 55 is at the full closed position P0.

According to the above configuration, when the door 5 is at the full closed position P0, an amount of protrusion of the link drive gear 190, which rotates integrally with the drive link 55 around the coupling axis 77 with respect to the vehicle body 2, toward the vehicle interior side can be suppressed to be small. Further, foreign matter is less likely to interfere with the gear tooth 191*a*. As a result, a protective structure of the link drive gear 190 on the vehicle interior side can be simplified. As a result, it is possible to expand a vehicle compartment space that can be efficiently used in the vicinity of the drive device 51, by suppressing the amount of protrusion to the vehicle interior side including the protective structure such as the cover member.

(2-4) The torque input gear 200 has a configuration of the two-stage gear 203 including the first gear portion 201 and the second gear portion 202 that integrally rotate coaxially. The second gear portion 202 that is input with a driving torque has a larger outer diameter than the first gear portion 201 that is meshed with the link drive gear 190. When the door 5 is at the full closed position P0, the link drive gear 190 does not protrude toward the vehicle interior side from the second gear portion 202 of the torque input gear 200.

By using the two-stage gear 203 as the torque input gear 200, a speed reduction mechanism can be formed compactly with a simple configuration. By suppressing the amount of protrusion of the link drive gear 190 toward the vehicle interior side with reference to the second gear portion 202 of the torque input gear 200, it is possible to more effectively expand the vehicle compartment space that can be efficiently used in the vicinity of the drive device 51.

(2-5) The link drive gear 190 has the cutout portion 230 obtained by cutting out the link drive gear 190 in a radial direction, in a circumferential range without the gear tooth 191*a*. The link drive gear 190 is configured such that the cutout portion 230 faces the vehicle interior side when the door 5 is at the full closed position P0.

According to the above configuration, the amount of protrusion of the link drive gear 190 toward the vehicle interior side can be further suppressed. As a result, the vehicle compartment space that can be efficiently used in the vicinity of the drive device 51 can be expanded more effectively.

(2-6) The door device 20 includes: the engagement recess 231 extending in a circumferential direction and provided in the cutout portion 230 of the link drive gear 190; and the engagement protrusion 232 arranged in the engagement recess 231, in a state of being fixed to the vehicle body 2. As a result, the stopper mechanism 235 is formed, which restricts the rotation of the link drive gear 190 within a range in which relative displacement of the engagement protrusion 232 in an extending direction of the engagement recess 231 is allowed.

According to the above configuration, an excessive closing operation of the drive link 55 exceeding the full closed position P0 of the door 5 and an excessive opening operation of the drive link 55 exceeding the full opened position P1 of the door 5 can be restricted by using a simple configuration. Then, the stopper mechanism 235 can be formed compactly by using the cutout portion 230 of the link drive gear 190.

(2-7) The interior member 240 of the vehicle 1 is disposed on the vehicle interior side of the link drive gear 190. The gear tooth 191*a* of the link drive gear 190 having a configuration of the sector gear 191 is configured to be disposed inside the insertion recess 242 provided in the interior member 240 when facing the vehicle interior side on the basis of the opening operation of the door 5.

According to the above configuration, the interior member 240 of the vehicle 1 can be disposed at a position closer to the transmission mechanism 70 constituting the drive device 51. As a result, it is possible to expand the vehicle compartment space that can be efficiently used.

Further, the interior member 240 disposed on the vehicle interior side of the link drive gear 190 functions as a protective member of the link drive gear 190. Accordingly, the link drive gear 190 can be protected during the opening operation of the door 5, whereby high reliability can be secured.

Each of the above embodiments can be implemented with modifications as follows. The each of the above embodiments and the following modification examples can be implemented in combination with each other within a range not technically contradictory.

In the first embodiment above, the first link arm 11 which is the main link 21 is used as the drive link 55. Then, among the first and second link-side coupling portions 73*a* and 73*b* constituting the proximal end bracket 61 of the first link arm 11, the engagement pin 83 protruding upward and erected on the first link-side coupling portion 73*a* located on a lower side is used as the shaft-shaped engagement portion 82. However, without limiting to this, the shape and the arrangement of the shaft-shaped engagement portion 82 may be freely changed.

Figure 22:
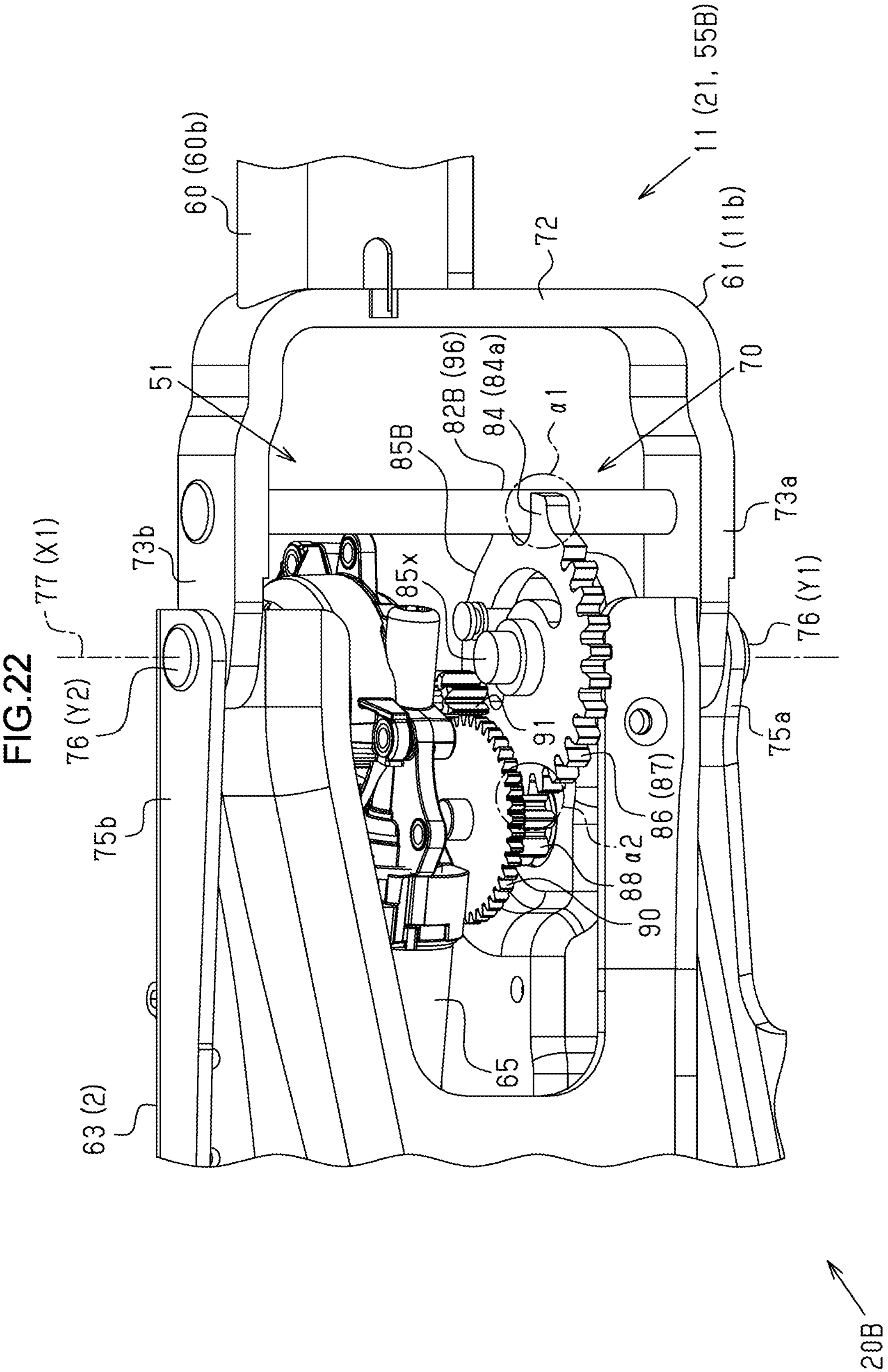
FIG. 22 is a perspective view of a drive device of another example.
Figure 23:
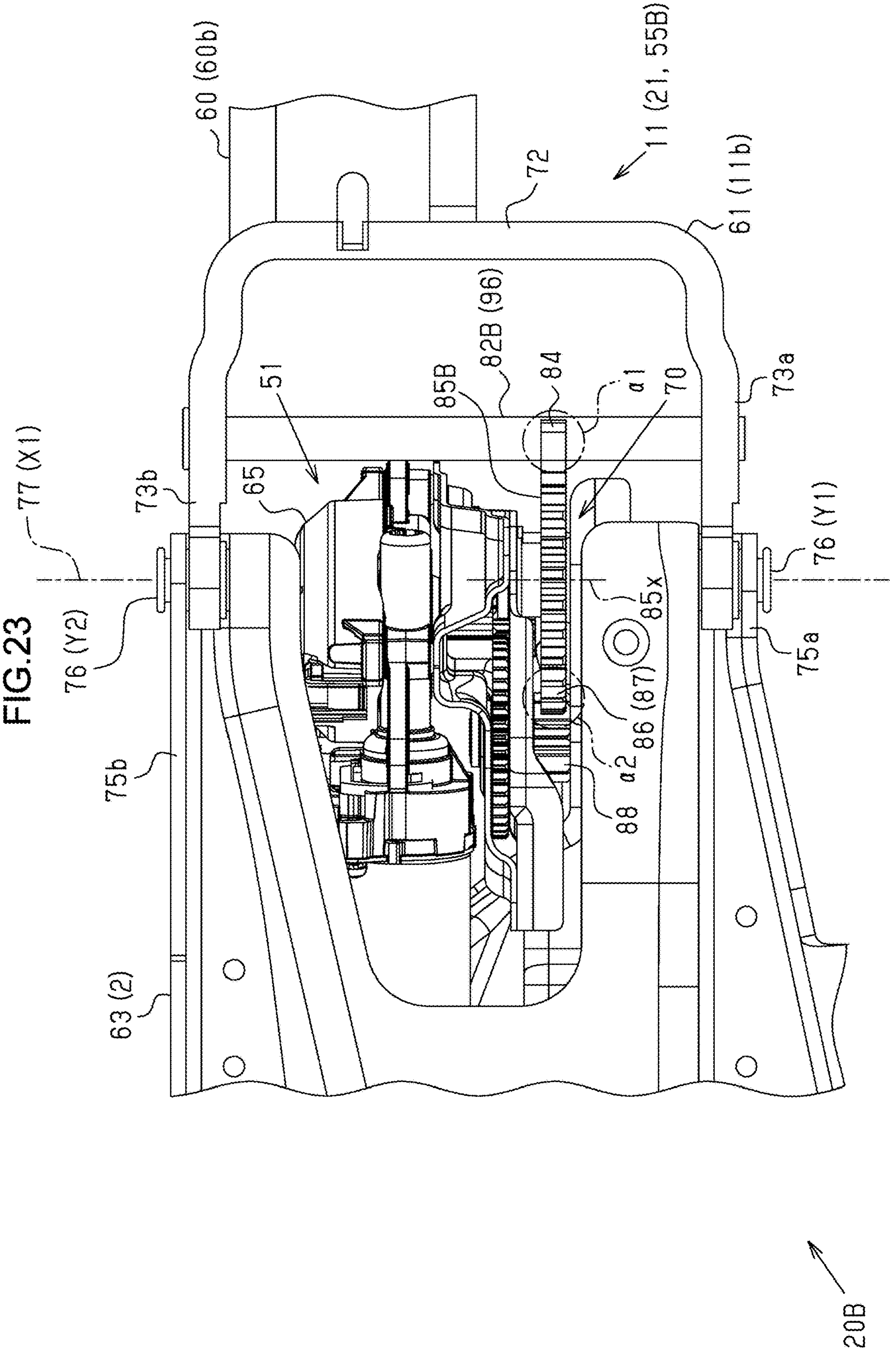
FIG. 23 is a rear view of the drive device of another example.

For example, as in a door device 20B of another example illustrated in FIGS. 22 and 23, a shaft-shaped engagement portion 82B may be formed by a shaft-shaped member 96 bridged between the first and second link-side coupling portions 73*a* and 73*b*. Even when such a configuration is adopted, the same effects as those of the above embodiments can be obtained. That is, in the axial direction of the coupling axis 77 of a drive link 55B, a position $\alpha$1 at which the engagement coupling portion 84 of a drive lever 85B is engaged with the shaft-shaped engagement portion 82B can be disposed at the same axial position as a position $\alpha$2 at which the torque input gear 88 is meshed with the transmission gear portion 86. Accordingly, it is possible to ensure high transmission efficiency of the driving torque.

By bridging the shaft-shaped engagement portion 82B between the first and second link-side coupling portions 73*a* and 73*b*, high rigidity and strength can be imparted to the proximal end bracket 61. Accordingly, stable opening and closing operations of the door 5 can be ensured. In addition, it is possible to increase a degree of freedom in setting the position $\alpha$1 at which the engagement coupling portion 84 of the drive lever 85B is engaged with the shaft-shaped engagement portion 82B, along an axial direction of the shaft-shaped engagement portion 82B.

Further, in the door device 20B of another example, the coupling axis 77 of the drive link 55B and the shaft-shaped engagement portion 82B are provided in parallel to each other. By adopting such a configuration, the driving torque can be transmitted more efficiently. Furthermore, there is also an advantage that a rotational operation of the drive lever 85B can be transmitted to the drive link 55B even when the support shaft 85*x* of the drive lever 85B is shifted from a position coaxial with the coupling axis 77 of the drive link 55B. As a result, assembly can be facilitated, and a smooth operation can be secured.

In the first embodiment above, the engagement coupling portion 84 of the drive lever 85 includes the pair of engagement claws 84*a* and 84*a* sandwiching the shaft-shaped engagement portion 82. However, without limiting to this, for example, the shape of the engagement coupling portion 84 may be freely changed as long as a rotational operation of the drive lever 85 can be efficiently transmitted to the drive link 55 in both directions around the support shaft 85*x*, such as an annular shape externally fitted to the shaft-shaped engagement portion 82.

In the first embodiment above, the drive lever 85 is not necessarily formed of a single member in which the engagement coupling portion 84 and the transmission gear portion 86 are continuous without discontinuity. For example, at least one of the engagement coupling portion 84 or the transmission gear portion 86 may be formed separately from a main body of the drive lever 85. The transmission gear portion 86 does not necessarily have the configuration of the sector gear 87. The drive lever 85 may be formed by assembling these divided members to each other.

In each of the above embodiments, the coupling axis 77 of the drive link 55 for the vehicle body 2 extends in the vertical direction of the vehicle 1, but is not necessarily strictly parallel to the vertical direction, and the coupling axis 77 may be inclined with respect to the vertical direction.

In each of the above embodiments, the transmission mechanism 70 is formed by fixing the drive transmission unit 80 including the support bracket 78, to the vehicle body bracket 63. The actuator 65 is disposed at the first rotary coupling point X1 of the first link arm 11 which is the drive link 55, in a state of being fixed to the drive transmission unit 80.

However, without limiting to this, in the first embodiment, the configuration of the transmission mechanism 70 may be freely changed as long as the configuration includes the shaft-shaped engagement portion 82, the drive lever 85, and the torque input gear 88 as described above. For example, the drive transmission unit 80 may not necessarily be unitized. For example, the actuator 65 may be disposed at a position separated from the first and second link-side coupling portions 73*a* and 73*b* forming the coupling axis 77 of the drive link 55 for the vehicle body 2 and from the first and second vehicle-body-side coupling portions 75*a* and 75*b*.

In the second embodiment above, the configuration of the transmission mechanism 70 may be freely changed as long as the link drive gear 190 and the torque input gear 200 are provided. For example, the drive transmission unit 80 may not necessarily be unitized. Furthermore, the structure forming the coupling axis 77 of the drive link 55 for the vehicle body 2 may also be freely changed.

In each of the above embodiments, the drive link 55 may not necessarily be the first link arm 11 which is the main link 21. The second link arm 12 which is the sub link 22 may be used as the drive link 55. Both the first and second link arms 11 and 12 may be used as the drive link 55. That is, the driving force of the actuator 65 may be applied to each of the first and second link arms 11 and 12.

In the first embodiment above, the drive link 55 does not necessarily have a U-shaped proximal end portion like the proximal end bracket 61. Any shape may be used as long as the shaft-shaped engagement portion 82 can be provided.

In the second embodiment above, the link drive gear 190 has the configuration of the sector gear 191 and includes the cutout portion 230 provided in the circumferential range without the gear tooth 191*a*. However, without limiting to this, the link drive gear 190 which is the sector gear 191 may have a configuration without such a cutout portion 230. That is, the link drive gear 190 may simply have a substantially circular planar shape having a circumferential range without the gear tooth 191*a*.

In the second embodiment above, the coupling pin 225 interposed between the lower bracket 221 and the middle bracket 222 of the drive transmission unit 80 functions as the engagement protrusion 232 of the stopper mechanism 235. However, without limiting to this, the configuration of the engagement protrusion 232 may be freely changed. The stopper mechanism 235 using the cutout portion 230 of the link drive gear 190 is not necessarily provided.

In the second embodiment above, the fixing structure of the link drive gear 190 for the drive link 55 may be freely changed.

In the second embodiment above, the torque input gear 200 has the configuration of the two-stage gear 203, but the configuration of the torque input gear 200 may be freely changed.

In the second embodiment above, the impact-absorbing member 241 as the interior member 240 is disposed at a position on the vehicle interior side of the link drive gear 190. However, without limiting to this, the interior member 240 disposed at a position on the vehicle interior side of the link drive gear 190 may be any member. However, the interior member 240 can preferably be formed with the insertion recess 242 disposed inside when the gear tooth 191*a* of the link drive gear 190 having the configuration of the sector gear 191 face the vehicle interior side on the basis of the opening operation of the door 5. The present disclosure may be applied to a configuration in which the interior member 240 of the vehicle 1 is not disposed at a position adjacent to the link drive gear 190.

In the second embodiment above, the door device 20 may include a cover member fixed to the vehicle body bracket 63 from the vehicle interior side.

SUMMARY OF PRESENT EMBODIMENT

The present embodiment includes at least the following configuration.

A vehicle door device (20; 20B) of the present embodiment includes: first and second link arms (11, 12) each having a first rotary coupling point (X1) with respect to a vehicle body (2) and a second rotary coupling point (X2) with respect to a door (5) of a vehicle (1); and a drive device (51) configured to cause the door (5) to perform opening and closing operations by rotating a drive link (55) that is at least one of the first and second link arms (11, 12), around a coupling axis (77) passing through the first rotary coupling point (X1). The drive device (51) includes an actuator (65) configured to output a driving torque and a transmission mechanism (70) configured to transmit the driving torque to the drive link (55). The transmission mechanism (70) includes: an engagement portion (82; 193) provided in the drive link (55); a support shaft (85*x*; 190*x*); a drive member (85; 190) supported rotatably around the support shaft (85*x*; 190*x*), and having an engagement coupling portion (84; 192) with respect to the engagement portion (82; 193) and a transmission gear portion (86) centered on the support shaft (85*x*; 190*x*); and a torque input gear (88; 200) configured to be input with the driving torque in a state of being meshed with the transmission gear portion (86). The transmission mechanism (70) is configured such that, in an axial direction of the coupling axis (77), a position (α1) at which the engagement coupling portion (84; 192) is engaged with the engagement portion (82; 193) is disposed at a position same as a position (α2) at which the torque input gear (88; 200) is meshed with the transmission gear portion (86).

In a case where the position at which the engagement coupling portion of the drive member is engaged with the engagement portion is axially shifted from the position at which the torque input gear is meshed with the transmission gear portion, a stress for twisting the drive member is applied to the drive member. However, according to the above configuration, such a load of the drive member is less likely to occur. As a result, it is possible to ensure high transmission efficiency of the driving torque by maintaining a favorable gear meshing state. In addition, even at a time of manual operation of the door, operation resistance can be suppressed to be small, and smooth opening and closing operations can be secured.

In the present embodiment, the engagement portion (82; 193) is preferably a shaft-shaped engagement portion (82) having a shaft shape.

According to the above configuration, the shape of the engagement portion can be simplified.

In the present embodiment, the engagement coupling portion (84) preferably includes a pair of engagement claws (84*a*) that sandwich the shaft-shaped engagement portion (82).

By adopting such a so-called crab-claw structure, the engagement coupling portion of the drive member can be easily engaged with the shaft-shaped engagement portion. Then, a rotational operation of the drive member can be efficiently transmitted to the drive link in both directions around the support shaft, on the basis of the engagement shape with respect to the shaft-shaped engagement portion.

In the present embodiment, the support shaft (85*x*; 190*x*) is preferably provided coaxially with the coupling axis (77).

According to the above configuration, the driving torque can be transmitted more efficiently. Furthermore, for example, an inclination of the shaft-shaped engagement portion in a radial direction of the coupling axis can be allowed, such as a configuration in which the shaft-shaped engagement portion is inclined toward the coupling axis of the drive link. As a result, a degree of freedom in designing the arrangement of the shaft-shaped engagement portion, the shape of the drive link, and the like can be increased, and mountability on the vehicle can be improved.

In the present embodiment, the support shaft (85*x*) and the shaft-shaped engagement portion (82) are preferably provided in parallel to each other.

According to the above configuration, the driving torque can be transmitted more efficiently. Furthermore, there is an advantage that a rotational operation of the drive member can be transmitted to the drive member even when the support shaft of the drive member is shifted from a position coaxial with the support shaft of the drive member. As a result, assembly can be facilitated, and a smooth operation can be secured.

In the present embodiment, it is preferable to further include a vehicle body bracket (63) fixed to the vehicle body (2) and having first and second vehicle-body-side coupling portions (75*a*, 75*b*) separated from each other in an axial direction of the coupling axis (77). The drive link (55) preferably includes first and second link-side coupling portions (73*a*, 73*b*) separated from each other in the axial direction of the coupling axis (77). The drive link (55) is preferably coupled to the vehicle body (2) by rotatably coupling the first and second link-side coupling portions (73*a*, 73*b*) to the first and second vehicle-body-side coupling portions (75*a*, 75*b*), respectively. In the axial direction of the coupling axis (77), the drive device (51) is preferably disposed between a first position (Y1) at which the first link-side coupling portion (73*a*) and the first vehicle-body-side coupling portion (75*a*) are coupled to each other and a second position (Y2) at which the second link-side coupling portion (73*b*) and the second vehicle-body-side coupling portion (75*b*) are coupled to each other.

According to the above configuration, the drive device can be compactly disposed with respect to the drive link. As a result, high mountability to the vehicle can be secured. Then, the position at which the engagement coupling portion of the drive member is engaged with the shaft-shaped engagement portion can be easily disposed at the same position as the position at which the torque input gear is meshed with the transmission gear portion. Further, the first and second vehicle-body-side coupling portions function as a protective member of the transmission mechanism. As a result, it is possible to expand a vehicle compartment space that can be efficiently used in the vicinity of the drive device.

In the present embodiment, the shaft-shaped engagement portion (82) is preferably bridged between the first and second link-side coupling portions (73*a*, 73*b*).

According to the above configuration, high rigidity and strength can be imparted to the proximal end portion of the drive link. Accordingly, stable opening and closing operations of the door can be ensured. In addition, it is possible to ensure a high degree of freedom in setting the position at which the engagement coupling portion of the drive member is engaged with the shaft-shaped engagement portion, along an axial direction of the shaft-shaped engagement portion.

In the present embodiment, the drive member (190) is preferably fixed to the drive link (55) to have a rotation center (M) coaxially with the coupling axis (77). The drive member (190) preferably has a gear tooth (191*a*) in a part of a circumferential range centered on the support shaft (190*x*). The transmission gear portion preferably includes the gear tooth (191*a*). The drive member (190) is preferably configured such that the gear tooth (191*a*) faces the vehicle exterior side when the door (5) supported by the drive link (55) is at the full closed position.

According to the above configuration, when the door is at the full closed position, an amount of protrusion of the drive member, which rotates integrally with the drive link around the coupling axis with respect to the vehicle body, toward the vehicle interior side can be suppressed to be small. Further, foreign matter is less likely to interfere with the gear tooth. As a result, a protective structure of the drive member on the vehicle interior side can be simplified. As a result, it is possible to expand a vehicle compartment space that can be efficiently used in the vicinity of the drive device, by suppressing the amount of protrusion to the vehicle interior side including the protective structure such as the cover member.

In the present embodiment, it is preferable that the torque input gear (200) include a first gear portion (201) and a second gear portion (202) that rotate together coaxially, the first gear portion (201) be meshed with the transmission gear portion, and the driving torque be input to the second gear portion (202). The second gear portion (202) preferably has an outer diameter larger than that of the first gear portion (201). The drive member (190) is preferably configured not to protrude toward the vehicle interior side from the second gear portion (202) when the door (5) is at the full closed position.

By using the two-stage gear as the torque input gear, a speed reduction mechanism can be formed compactly with a simple configuration. By suppressing the amount of protrusion of the drive member toward the vehicle interior side with reference to the second gear portion of the torque input gear, it is possible to more effectively expand the vehicle compartment space that can be efficiently used in the vicinity of the drive device.

In the present embodiment, the drive member (190) preferably has a cutout portion (230) obtained by cutting out the drive member (190) in a circumferential range without the gear tooth (191*a*), in a circumferential range centered on the support shaft (190*x*). The cutout portion (230) is preferably configured to face the vehicle interior side when the door (5) is at the full closed position.

According to the above configuration, the amount of protrusion of the drive member toward the vehicle interior side can be further suppressed. As a result, the vehicle compartment space that can be efficiently used in the vicinity of the drive device can be expanded more effectively.

In the present embodiment, it is preferable to further include a stopper mechanism having: an engagement recess (231) provided in the cutout portion (230) and extending in the circumferential direction of the support shaft (190*x*); and an engagement protrusion portion (232) arranged in the engagement recess (231) in a state of being fixed to the vehicle body (2). The stopper mechanism is preferably configured to restrict rotation of the drive member (190) within a range in which displacement of the engagement protrusion (232) in the engagement recess (231) is allowed.

According to the above configuration, an excessive closing operation of the drive link exceeding the full closed position of the door and an excessive opening operation of the drive link exceeding the full opened position of the door can be restricted by using a simple configuration. Then, the stopper mechanism can be formed compactly by using the cutout portion of the drive member.

In the present embodiment, it is preferable that an interior member (240) of the vehicle (1) be disposed on a vehicle interior side of the drive member (190), and an insertion recess (242) be provided in the interior member (240). The gear tooth (191*a*) is preferably disposed inside the insertion recess (242) when facing the vehicle interior side on the basis of an opening operation of the door (5).

According to the above configuration, the interior member of the vehicle can be disposed at a position closer to the transmission mechanism constituting the drive device. As a result, it is possible to expand the vehicle compartment space that can be efficiently used. Further, the interior member disposed on the vehicle interior side of the drive member functions as a protective member of the drive member. Accordingly, the drive member can be protected during the opening operation of the door, whereby high reliability can be secured.

REFERENCE SIGNS LIST

2: Vehicle body, 5: Door, 11: First link arm, 12: Second link arm, 15: Link mechanism, 20: Door device, 51: Drive device, 55: Drive link, 65: Actuator, 70: Transmission mechanism, 77: Coupling axis, 82: Shaft-shaped engagement portion, 84: Engagement coupling portion, 85: Drive lever, 85*x*, 190*x*: Support shaft, 86: Transmission gear portion, 88, 100: Torque input gear, 190: Link drive gear, 191: Sector gear, 191*a*: Gear tooth, X1: First rotary coupling point, X2: Second rotary coupling point, M: Rotation center, P0: Full closed position, and α1, α2: Position

The invention claimed is:

1. A vehicle door device comprising:

first and second link arms each having a first rotary coupling point with respect to a vehicle body and a second rotary coupling point with respect to a door of a vehicle; and a drive device configured to cause the door to perform opening and closing operations by rotating a drive link that is at least one of the first and second link arms, around a coupling axis passing through the first rotary coupling point, wherein the drive device includes:

an actuator configured to output a driving torque; and a transmission mechanism configured to transmit the driving torque to the drive link, the transmission mechanism includes:

an engagement portion provided to the drive link;

a support shaft; and a drive member supported rotatably around the support shaft, and having an engagement coupling portion with respect to the engagement portion and a transmission gear portion centered on the support shaft; and a torque input gear configured to be input with the driving torque in a state of being meshed with the transmission gear portion, and the transmission mechanism has a configuration in which, in an axial direction of the coupling axis, a position at which the engagement coupling portion is engaged with the engagement portion is disposed at a position same as a position at which the torque input gear is meshed with the transmission gear portion.

2. The vehicle door device according to claim 1, wherein the engagement portion is a shaft-shaped engagement portion having a shaft shape.

3. The vehicle door device according to claim 2, wherein the engagement coupling portion includes a pair of engagement claws that sandwich the shaft-shaped engagement portion.

4. The vehicle door device according to claim 1, wherein the support shaft is provided coaxially with the coupling axis.

5. The vehicle door device according to claim 2, wherein the support shaft and the shaft-shaped engagement portion are provided in parallel to each other.

6. The vehicle door device according to claim 2, further comprising:

a vehicle body bracket fixed to the vehicle body and having first and second vehicle-body-side coupling portions separated from each other in an axial direction of the coupling axis, wherein the drive link includes first and second link-side coupling portions separated from each other in an axial direction of the coupling axis, the drive link is coupled to the vehicle body by rotatably coupling the first and second link-side coupling portions to the first and second vehicle-body-side coupling portions, respectively, and in an axial direction of the coupling axis, the drive device is disposed between a first position at which the first link-side coupling portion and the first vehicle-body-side coupling portion are coupled to each other and a second position at which the second link-side coupling portion and the second vehicle-body-side coupling portion are coupled to each other.

7. The vehicle door device according to claim 6, wherein the shaft-shaped engagement portion is bridged between the first and second link-side coupling portions.

8. The vehicle door device according to claim 1, wherein the drive member is fixed to the drive link to have a rotation center coaxially with the coupling axis, the drive member has a gear tooth in a part of a circumferential range centered on the support shaft, the transmission gear portion includes the gear tooth, and the drive member has a configuration in which the gear tooth faces a vehicle exterior side when the door supported by the drive link is at a full closed position.

9. The vehicle door device according to claim 8, wherein the torque input gear includes a first gear portion and a second gear portion that rotate together coaxially, the first gear portion is meshed with the transmission gear portion, and the driving torque is input to the second gear portion, the second gear portion has an outer diameter larger than an outer diameter of the first gear portion, and the drive member is configured not to protrude toward a vehicle interior side from the second gear portion when the door is at a full closed position.

10. The vehicle door device according to claim 8, wherein the drive member has a cutout portion obtained by cutting out the drive member, in a circumferential range without the gear tooth in a circumferential range centered on the support shaft, and the cutout portion is configured to face a vehicle interior side when the door is at a full closed position.

11. The vehicle door device according to claim 10, further comprising:

a stopper mechanism having: an engagement recess provided in the cutout portion and extending in a circumferential direction of the support shaft; and an engagement protrusion disposed in the engagement recess, in a state of being fixed to the vehicle body, wherein the stopper mechanism is configured to restrict rotation of the drive member within a range in which displacement of the engagement protrusion in the engagement recess is allowed.

12. The vehicle door device according to claim 8, wherein an interior member of the vehicle is disposed on a vehicle interior side of the drive member, the interior member is provided with an insertion recess, and the gear tooth is disposed inside the insertion recess when facing the vehicle interior side on a basis of an opening operation of the door.

13. The vehicle door device according to claim 2, wherein the support shaft is provided coaxially with the coupling axis.

14. The vehicle door device according to claim 3, wherein the support shaft is provided coaxially with the coupling axis.

15. The vehicle door device according to claim 3, wherein the support shaft and the shaft-shaped engagement portion are provided in parallel to each other.

16. The vehicle door device according to claim 3, further comprising:

a vehicle body bracket fixed to the vehicle body and having first and second vehicle-body-side coupling portions separated from each other in an axial direction of the coupling axis, wherein the drive link includes first and second link-side coupling portions separated from each other in an axial direction of the coupling axis, the drive link is coupled to the vehicle body by rotatably coupling the first and second link-side coupling portions to the first and second vehicle-body-side coupling portions, respectively, and in an axial direction of the coupling axis, the drive device is disposed between a first position at which the first link-side coupling portion and the first vehicle-body-side coupling portion are coupled to each other and a second position at which the second link-side coupling portion and the second vehicle-body-side coupling portion are coupled to each other.

17. The vehicle door device according to claim 16, wherein the shaft-shaped engagement portion is bridged between the first and second link-side coupling portions.

18. The vehicle door device according to claim 9, wherein the drive member has a cutout portion obtained by cutting out the drive member, in a circumferential range without the gear tooth in a circumferential range centered on the support shaft, and the cutout portion is configured to face a vehicle interior side when the door is at a full closed position.

19. The vehicle door device according to claim 18, further comprising:

a stopper mechanism having: an engagement recess provided in the cutout portion and extending in a circumferential direction of the support shaft; and an engagement protrusion disposed in the engagement recess, in a state of being fixed to the vehicle body, wherein the stopper mechanism is configured to restrict rotation of the drive member within a range in which displacement of the engagement protrusion in the engagement recess is allowed.

20. The vehicle door device according to claim 9, wherein an interior member of the vehicle is disposed on a vehicle interior side of the drive member, the interior member is provided with an insertion recess, and the gear tooth is disposed inside the insertion recess when facing the vehicle interior side on a basis of an opening operation of the door.

* * * * *